United States Patent
Kenjo

(10) Patent No.: US 10,834,294 B2
(45) Date of Patent: Nov. 10, 2020

(54) IMAGING DEVICE, IMAGING ELEMENT, AND METHOD OF CONTROLLING IMAGING DEVICE

(71) Applicant: SONY SEMICONDUCTOR SOLUTIONS CORPORATION, Kanagawa (JP)

(72) Inventor: Yukinao Kenjo, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/340,963

(22) PCT Filed: Sep. 8, 2017

(86) PCT No.: PCT/JP2017/032487
§ 371 (c)(1),
(2) Date: Apr. 10, 2019

(87) PCT Pub. No.: WO2018/105187
PCT Pub. Date: Jun. 14, 2018

(65) Prior Publication Data
US 2019/0289171 A1    Sep. 19, 2019

(30) Foreign Application Priority Data
Dec. 8, 2016  (JP) ................................ 2016-238086

(51) Int. Cl.
*H04N 3/14*    (2006.01)
*H04N 5/345*    (2011.01)
(Continued)

(52) U.S. Cl.
CPC .......... *H04N 3/1562* (2013.01); *H04N 5/225* (2013.01); *H04N 5/232* (2013.01);
(Continued)

(58) Field of Classification Search
CPC ... H04N 3/1562; H04N 5/353; H04N 5/23274
See application file for complete search history.

(56) References Cited

U.S. PATENT DOCUMENTS

2005/0253940 A1* 11/2005 Chiba ................ H04N 5/23245
                                                348/247
2008/0024631 A1* 1/2008 Tani ................... H04N 5/23254
                                                348/264
(Continued)

FOREIGN PATENT DOCUMENTS

EP        1601187 A1    11/2005
EP        3054664 A1    8/2016
(Continued)

OTHER PUBLICATIONS

International Search Report and Written Opinion of PCT Application No. PCT/JP2017/032487, dated Nov. 21, 2017, 09 pages of ISRWO.

*Primary Examiner* — Christopher K Peterson
(74) *Attorney, Agent, or Firm* — Chip Law Group

(57) ABSTRACT

To facilitate conversion of a frame rate of moving image data in an imaging element that images the moving image data. A pixel array unit is divided into a plurality of divided regions each including a plurality of partial regions. A scanning circuit sequentially performs control of exposing a predetermined number of regions of the plurality of partial regions as first partial regions to output first pixel data in each of the plurality of divided regions, and control of exposing a region different from the first partial regions of the plurality of partial regions as a second partial region to output second pixel data in each of the plurality of divided regions. An image processing unit sequentially performs processing of arraying the first pixel data to generate a first frame and processing of arraying the second pixel data to generate a second frame.

12 Claims, 37 Drawing Sheets

(51) Int. Cl.
     *H04N 5/353*           (2011.01)
     *H04N 5/369*           (2011.01)
     *H04N 5/232*           (2006.01)
     *H04N 5/225*           (2006.01)
     *H04N 5/341*           (2011.01)
     *H04N 5/3745*         (2011.01)
     *H04N 5/235*           (2006.01)
     *H04N 5/367*           (2011.01)

(52) U.S. Cl.
     CPC ......... *H04N 5/23274* (2013.01); *H04N 5/341* (2013.01); *H04N 5/345* (2013.01); *H04N 5/353* (2013.01); *H04N 5/369* (2013.01); *H04N 5/37455* (2013.01); *H04N 5/2353* (2013.01)

(56) References Cited

U.S. PATENT DOCUMENTS

2015/0350555 A1* 12/2015 Nishi ................... H04N 5/341
                                                                      348/333.02
2017/0155844 A1* 6/2017 Iso ...................... H04N 5/345

FOREIGN PATENT DOCUMENTS

| | | |
|---|---|---|
| JP | 2005-328421 A | 11/2005 |
| JP | 2008-035278 A | 2/2008 |
| JP | 2016-019076 A | 2/2016 |
| WO | 2015/045144 A1 | 4/2015 |
| WO | 2016/006430 A1 | 1/2016 |

* cited by examiner

FIG. 6

| | | | | | | | | | | | | | | | |
|---|---|---|---|---|---|---|---|---|---|---|---|---|---|---|---|
| | | | | | AREA A[0][0] | | | | | | | | | | 221 |
| 0 | 1 | 128 | 129 | 32 | 33 | 160 | 161 | 8 | 9 | 136 | 137 | 40 | 41 | 168 | 169 |
| 3 | 2 | 131 | 130 | 35 | 34 | 163 | 162 | 11 | 10 | 139 | 138 | 43 | 42 | 171 | 170 |
| 192 | 193 | 64 | 65 | 224 | 225 | 96 | 97 | 200 | 201 | 72 | 73 | 232 | 233 | 104 | 105 |
| 195 | 194 | 67 | 66 | 227 | 226 | 99 | 98 | 203 | 202 | 75 | 74 | 235 | 234 | 107 | 106 |
| 48 | 49 | 176 | 177 | 16 | 17 | 144 | 145 | 56 | 57 | 184 | 185 | 24 | 25 | 152 | 153 |
| 51 | 50 | 179 | 178 | 19 | 18 | 147 | 146 | 59 | 58 | 187 | 186 | 27 | 26 | 155 | 154 |
| 240 | 241 | 112 | 113 | 208 | 209 | 80 | 81 | 248 | 249 | 120 | 121 | 216 | 217 | 88 | 89 |
| 243 | 242 | 115 | 114 | 211 | 210 | 83 | 82 | 251 | 250 | 123 | 122 | 219 | 218 | 91 | 90 |
| 12 | 13 | 140 | 141 | 44 | 45 | 172 | 173 | 4 | 5 | 132 | 133 | 36 | 37 | 164 | 165 |
| 15 | 14 | 143 | 142 | 47 | 46 | 175 | 174 | 7 | 6 | 135 | 134 | 39 | 38 | 167 | 166 |
| 204 | 205 | 76 | 77 | 236 | 237 | 108 | 109 | 196 | 197 | 68 | 69 | 228 | 229 | 100 | 101 |
| 207 | 206 | 79 | 78 | 239 | 238 | 111 | 110 | 199 | 198 | 71 | 70 | 231 | 230 | 103 | 102 |
| 60 | 61 | 188 | 189 | 28 | 29 | 156 | 157 | 52 | 53 | 180 | 181 | 20 | 21 | 148 | 149 |
| 63 | 62 | 191 | 190 | 31 | 30 | 159 | 158 | 55 | 54 | 183 | 182 | 23 | 22 | 151 | 150 |
| 252 | 253 | 124 | 125 | 220 | 221 | 92 | 93 | 244 | 245 | 116 | 117 | 212 | 213 | 84 | 85 |
| 255 | 254 | 127 | 126 | 223 | 222 | 95 | 94 | 247 | 246 | 119 | 118 | 215 | 214 | 87 | 86 |

FIG. 7

| | | | | | | | | | | | | | | | |
|---|---|---|---|---|---|---|---|---|---|---|---|---|---|---|---|
| 0 | 1 | 128 | 129 | 32 | 33 | 160 | 161 | 8 | 9 | 136 | 137 | 40 | 41 | 168 | 169 |
| 3 | 2 | 130 | 130 | 35 | 34 | 163 | 162 | 11 | 10 | 139 | 138 | 43 | 42 | 171 | 170 |
| 192 | 193 | 64 | 65 | 224 | 225 | 96 | 97 | 200 | 201 | 72 | 73 | 232 | 233 | 104 | 105 |
| 195 | 194 | 67 | 66 | 227 | 226 | 99 | 98 | 203 | 202 | 75 | 74 | 235 | 234 | 107 | 106 |
| 48 | 49 | 176 | 177 | 16 | 17 | 144 | 145 | 56 | 57 | 184 | 185 | 24 | 25 | 152 | 153 |
| 51 | 50 | 179 | 178 | 19 | 18 | 147 | 146 | 59 | 58 | 187 | 186 | 27 | 26 | 155 | 154 |
| 240 | 241 | 112 | 113 | 208 | 209 | 80 | 81 | 248 | 249 | 120 | 121 | 216 | 217 | 88 | 89 |
| 243 | 242 | 115 | 114 | 211 | 210 | 83 | 82 | 251 | 250 | 123 | 122 | 219 | 218 | 91 | 90 |
| 12 | 13 | 140 | 141 | 44 | 45 | 172 | 173 | 4 | 5 | 132 | 133 | 36 | 37 | 164 | 165 |
| 15 | 14 | 143 | 142 | 47 | 46 | 175 | 174 | 7 | 6 | 135 | 134 | 39 | 38 | 167 | 166 |
| 204 | 205 | 76 | 77 | 236 | 237 | 108 | 109 | 196 | 197 | 68 | 69 | 228 | 229 | 100 | 101 |
| 207 | 206 | 79 | 78 | 239 | 238 | 111 | 110 | 199 | 198 | 71 | 70 | 231 | 230 | 103 | 102 |
| 60 | 61 | 188 | 189 | 28 | 29 | 156 | 157 | 52 | 53 | 180 | 181 | 20 | 21 | 148 | 149 |
| 63 | 62 | 191 | 190 | 31 | 30 | 159 | 158 | 55 | 54 | 183 | 182 | 23 | 22 | 151 | 150 |
| 252 | 253 | 124 | 125 | 220 | 221 | 92 | 93 | 244 | 245 | 116 | 117 | 212 | 213 | 84 | 85 |
| 255 | 254 | 127 | 126 | 223 | 222 | 95 | 94 | 247 | 246 | 119 | 118 | 215 | 214 | 87 | 86 |

LAYER L2[0][0], AREA A[0][0], 221

| | | | | | | | | | | | | | | | |
|---|---|---|---|---|---|---|---|---|---|---|---|---|---|---|---|
| 0 | 1 | 128 | 129 | 32 | 33 | 160 | 161 | 8 | 9 | 136 | 137 | 40 | 41 | 168 | 169 |
| 3 | 2 | 130 | 130 | 35 | 34 | 163 | 162 | 11 | 10 | 139 | 138 | 43 | 42 | 171 | 170 |
| 192 | 193 | 64 | 65 | 224 | 225 | 96 | 97 | 200 | 201 | 72 | 73 | 232 | 233 | 104 | 105 |
| 195 | 194 | 67 | 66 | 227 | 226 | 99 | 98 | 203 | 202 | 75 | 74 | 235 | 234 | 107 | 106 |
| 48 | 49 | 176 | 177 | 16 | 17 | 144 | 145 | 56 | 57 | 184 | 185 | 24 | 25 | 152 | 153 |
| 51 | 50 | 179 | 178 | 19 | 18 | 147 | 146 | 59 | 58 | 187 | 186 | 27 | 26 | 155 | 154 |
| 240 | 241 | 112 | 113 | 208 | 209 | 80 | 81 | 248 | 249 | 120 | 121 | 216 | 217 | 88 | 89 |
| 243 | 242 | 115 | 114 | 211 | 210 | 83 | 82 | 251 | 250 | 123 | 122 | 219 | 218 | 91 | 90 |
| 12 | 13 | 140 | 141 | 44 | 45 | 172 | 173 | 4 | 5 | 132 | 133 | 36 | 37 | 164 | 165 |
| 15 | 14 | 143 | 142 | 47 | 46 | 175 | 174 | 7 | 6 | 135 | 134 | 39 | 38 | 167 | 166 |
| 204 | 205 | 76 | 77 | 236 | 237 | 108 | 109 | 196 | 197 | 68 | 69 | 228 | 229 | 100 | 101 |
| 207 | 206 | 79 | 78 | 239 | 238 | 111 | 110 | 199 | 198 | 71 | 70 | 231 | 230 | 103 | 102 |
| 60 | 61 | 188 | 189 | 28 | 29 | 156 | 157 | 52 | 53 | 180 | 181 | 20 | 21 | 148 | 149 |
| 63 | 62 | 191 | 190 | 32 | 30 | 159 | 158 | 55 | 54 | 183 | 182 | 23 | 22 | 151 | 150 |
| 252 | 253 | 124 | 125 | 220 | 221 | 92 | 93 | 244 | 245 | 116 | 117 | 212 | 213 | 84 | 85 |
| 255 | 254 | 127 | 126 | 223 | 222 | 95 | 94 | 247 | 246 | 119 | 118 | 215 | 214 | 87 | 86 |

LAYER L2[0][0]  AREA A[0][0]  221

FIG. 10

| | | | | | | | | | | | | | | | |
|---|---|---|---|---|---|---|---|---|---|---|---|---|---|---|---|
| 0 | 1 | 128 | 129 | 32 | 33 | 160 | 161 | 8 | 9 | 136 | 137 | 40 | 41 | 168 | 169 |
| 3 | 2 | 130 | 131 | 35 | 34 | 163 | 162 | 11 | 10 | 139 | 138 | 43 | 42 | 171 | 170 |
| 192 | 193 | 64 | 65 | 224 | 225 | 96 | 97 | 200 | 201 | 72 | 73 | 232 | 233 | 104 | 105 |
| 195 | 194 | 67 | 66 | 227 | 226 | 99 | 98 | 203 | 202 | 75 | 74 | 235 | 234 | 107 | 106 |
| 48 | 49 | 176 | 177 | 16 | 17 | 144 | 145 | 56 | 57 | 184 | 185 | 24 | 25 | 152 | 153 |
| 51 | 50 | 179 | 178 | 19 | 18 | 147 | 146 | 59 | 58 | 187 | 186 | 27 | 26 | 155 | 154 |
| 240 | 241 | 112 | 113 | 208 | 209 | 80 | 81 | 248 | 249 | 120 | 121 | 216 | 217 | 88 | 89 |
| 243 | 242 | 115 | 114 | 211 | 210 | 83 | 82 | 251 | 250 | 123 | 122 | 219 | 218 | 91 | 90 |
| 12 | 13 | 140 | 141 | 44 | 45 | 172 | 173 | 4 | 5 | 132 | 133 | 36 | 37 | 164 | 165 |
| 15 | 14 | 143 | 142 | 47 | 46 | 175 | 174 | 7 | 6 | 135 | 134 | 39 | 38 | 167 | 166 |
| 204 | 205 | 76 | 77 | 236 | 237 | 108 | 109 | 196 | 197 | 68 | 69 | 228 | 229 | 100 | 101 |
| 207 | 206 | 79 | 78 | 239 | 238 | 111 | 110 | 199 | 198 | 71 | 70 | 231 | 230 | 103 | 102 |
| 60 | 61 | 188 | 189 | 28 | 29 | 156 | 157 | 52 | 53 | 180 | 181 | 20 | 21 | 148 | 149 |
| 63 | 62 | 191 | 190 | 31 | 30 | 159 | 158 | 55 | 54 | 183 | 182 | 23 | 22 | 151 | 150 |
| 252 | 253 | 124 | 125 | 220 | 221 | 92 | 93 | 244 | 245 | 116 | 117 | 212 | 213 | 84 | 85 |
| 255 | 254 | 127 | 126 | 223 | 222 | 95 | 94 | 247 | 246 | 119 | 118 | 215 | 214 | 87 | 86 |

LAYER L2[0][0]  AREA A[0][0]  221

FIG. 20

| 1 | 2 | 1 |
|---|---|---|
| 2 | 4 | 2 |
| 1 | 2 | 1 |

|  | RASTER SCAN | RANDOM SCAN | Q TREE SCAN |
|---|---|---|---|
| MAXIMUM VALUE | 0.718519 | 0.088536 | 0.002824 |
| AVERAGE VALUE | 0.69957355 | 0.033868726 | 2.84677E-05 |

IMAGING DEVICE, IMAGING ELEMENT, AND METHOD OF CONTROLLING IMAGING DEVICE

CROSS REFERENCE TO RELATED APPLICATIONS

This application is a U.S. National Phase of International Patent Application No. PCT/JP2017/032487 filed on Sep. 8, 2017, which claims priority benefit of Japanese Patent Application No. JP 2016-238086 filed in the Japan Patent Office on Dec. 8, 2016. Each of the above-referenced applications is hereby incorporated herein by reference in its entirety.

TECHNICAL FIELD

The present technology relates to an imaging device, an imaging element, and a method of controlling an imaging device. Specifically, the present invention relates to an imaging device that images moving image data, an imaging element, and a method of controlling an imaging device.

BACKGROUND ART

Conventionally, in an imaging device such as a digital video camera, a solid-state imaging element is used for imaging image data. For example, a solid-state imaging element having a pixel array divided into a plurality of rectangular areas and having an analog to digital converter (ADC) arranged in each of the areas has been proposed (for example, see Patent Document 1).

CITATION LIST

Patent Document

Patent Document 1: Japanese Patent Application Laid-Open No. 2016-19076

SUMMARY OF THE INVENTION

Problems to be Solved by the Invention

In the above-described conventional technology, to image moving image data including a plurality of image data and increase a frame rate of the moving image data after imaging, a new frame needs to be interpolated between two consecutive frames. However, in the method of interpolating a frame, a processing amount required for the interpolation becomes larger as a data amount of the moving image data is larger, and the interpolation becomes more inaccurate as a subject more actively moves. As described above, the above solid-state imaging element has a problem that conversion of the frame rate is difficult in moving image data having a large data amount or moving image data obtained by imaging a subject that actively moves.

The present technology has been made in view of the foregoing, and an object is to facilitate conversion of a frame rate of moving image data in an imaging element that images the moving image data.

Solutions to Problems

The present technology has been made to solve the above-described problem, and a first aspect of the present technology is an imaging device including a pixel array unit divided into a plurality of divided regions, each divided region including a plurality of partial regions, a scanning circuit configured to sequentially perform control of exposing a predetermined number of regions of the plurality of partial regions as first partial regions to output first pixel data in each of the plurality of divided regions, and control of exposing a region different from the first partial regions of the plurality of partial regions as a second partial region to output second pixel data in each of the plurality of divided regions, and an image processing unit configured to sequentially perform processing of generating a first frame from the first pixel data and processing of generating a second frame from the second pixel data, and a method of controlling the imaging device. The above configuration exerts an effect to generate the first frame from the pixel data by the exposure of the first partial region and to generate the second frame by the exposure of the second partial region.

Furthermore, in the first aspect, the plurality of divided regions may be regions obtained by dividing the pixel array unit by quadtree division, the plurality of partial regions may be regions obtained by dividing each of the plurality of divided regions by quadtree division, and the scanning circuit may obtain each of the first and second partial regions by quadtree search expose the first and second partial regions. The above configuration exerts an effect to acquire each of the first and second partial regions by quadtree search.

Furthermore, in the first aspect, a plurality of analog-digital converters connected to segmented regions different from one another may be further included, each of the segmented regions may include a predetermined number of the divided regions, and each of the plurality of analog-digital converters may perform analog-digital conversion for pixel data from the connected segmented region and supply the converted pixel data to the image processing unit. The above configuration exerts an effect to perform analog-digital conversion for each segmented region.

Furthermore, in the first aspect, a signal line wired in a predetermined direction in the pixel array unit may be further included, the pixel data may be transmitted via the signal line, and the scanning circuit may expose the partial regions different from one another in each of the segmented regions arrayed along a predetermined direction as the first partial regions. The above configuration exerts an effect to expose the partial regions different from each other in each of the segmented regions arrayed along the predetermined direction.

Furthermore, in the first aspect, the scanning circuit may perform the control in synchronization with a predetermined synchronization signal, and a blank interval from timing when last pixel data in the segmented region is output to timing of rising of the predetermined synchronization signal may be substantially zero. The above configuration exerts an effect to secure temporal and spatial uniformity of exposure timing.

Furthermore, in the first aspect, a motion sensor configured to detect a motion of the imaging device may be further included, and the image processing unit may map the first pixel data on the basis of the motion from one to the other of an exposure center time of the first frame and an exposure center time of the first pixel data to generate the first frame, and map the second pixel data on the basis of the motion from one to the other of an exposure center time of the second frame and an exposure center time of the second pixel data to generate the second frame. The above configuration exerts an effect to generate the frame by the mapping based on the motion from the motion sensor.

Furthermore, in the first aspect, the image processing unit may interpolate a defective pixel in each of the generated first and second frames. The above configuration exerts an effect to generate the frame with the interpolated defective pixel.

Furthermore, in the first aspect, the image processing unit may include a first stage processing unit that generates moving image data including the first frame and the second frame, a motion estimation unit that estimates a motion of the imaging device from the moving image data, and a second stage processing unit that maps the first pixel data on the basis of the motion from one to the other of an exposure center time of the first frame and an exposure center time of the first pixel data to generate the first frame, and maps the second pixel data on the basis of the motion from one to the other of an exposure center time of the second frame and an exposure center time of the second pixel data to generate the second frame. The above configuration exerts an effect to generate the frame by the mapping based on the motion estimated from the moving image data.

Furthermore, in the first aspect, the image processing unit may enlarge dynamic ranges of the first and second frames. The above configuration exerts an effect to generate the frame with a large dynamic range.

Furthermore, in the first aspect, the image processing unit may generate the first and second frames partially overlapping with each other. The above configuration exerts an effect to improve resolution and a frame rate of the frame.

Furthermore, a second aspect of the present technology is an imaging element including a pixel array unit divided into a plurality of divided regions, each divided region including a plurality of partial regions, and a scanning circuit configured to sequentially perform control of exposing a predetermined number of regions of the plurality of partial regions as first partial regions to output first pixel data in each of the plurality of divided regions, and control of exposing a region different from the first partial regions of the plurality of partial regions as a second partial region to output second pixel data in each of the plurality of divided regions. The above configuration exerts an effect to expose each of the partial regions corresponding to the frames different from each other.

Effects of the Invention

According to the present technology, an excellent effect to facilitate conversion of a frame rate of moving image data in an imaging element that images the moving image data can be exhibited. Note that the effects described here are not necessarily limited, and any of effects described in the present disclosure may be exhibited.

BRIEF DESCRIPTION OF DRAWINGS

FIG. 6 is a diagram illustrating an example of an exposure order of pixels in an area according to the first embodiment of the present technology.

FIG. 7 is a diagram illustrating a region corresponding to a first subframe according to the first embodiment of the present technology.

FIG. 8 is a diagram illustrating a region corresponding to a second subframe according to the first embodiment of the present technology.

FIG. 9 is a diagram illustrating a region corresponding to a third subframe according to the first embodiment of the present technology.

FIG. 10 is a diagram illustrating a region corresponding to a fourth subframe according to the first embodiment of the present technology.

FIG. 20 is a diagram illustrating a configuration example of coefficients in a Gaussian filter according to the first embodiment of the present technology.

MODE FOR CARRYING OUT THE INVENTION

Hereinafter, modes for implementing the present technology (hereinafter referred to as embodiments) will be described. Description will be given according to the following order.
1. First Embodiment (an example of exposing different portions in a layer for each subframe)
2. Second Embodiment (an example of estimating a motion and exposing different portions in a layer for each subframe)

1. First Embodiment

[Configuration Example of Imaging Device]

Figure 1:
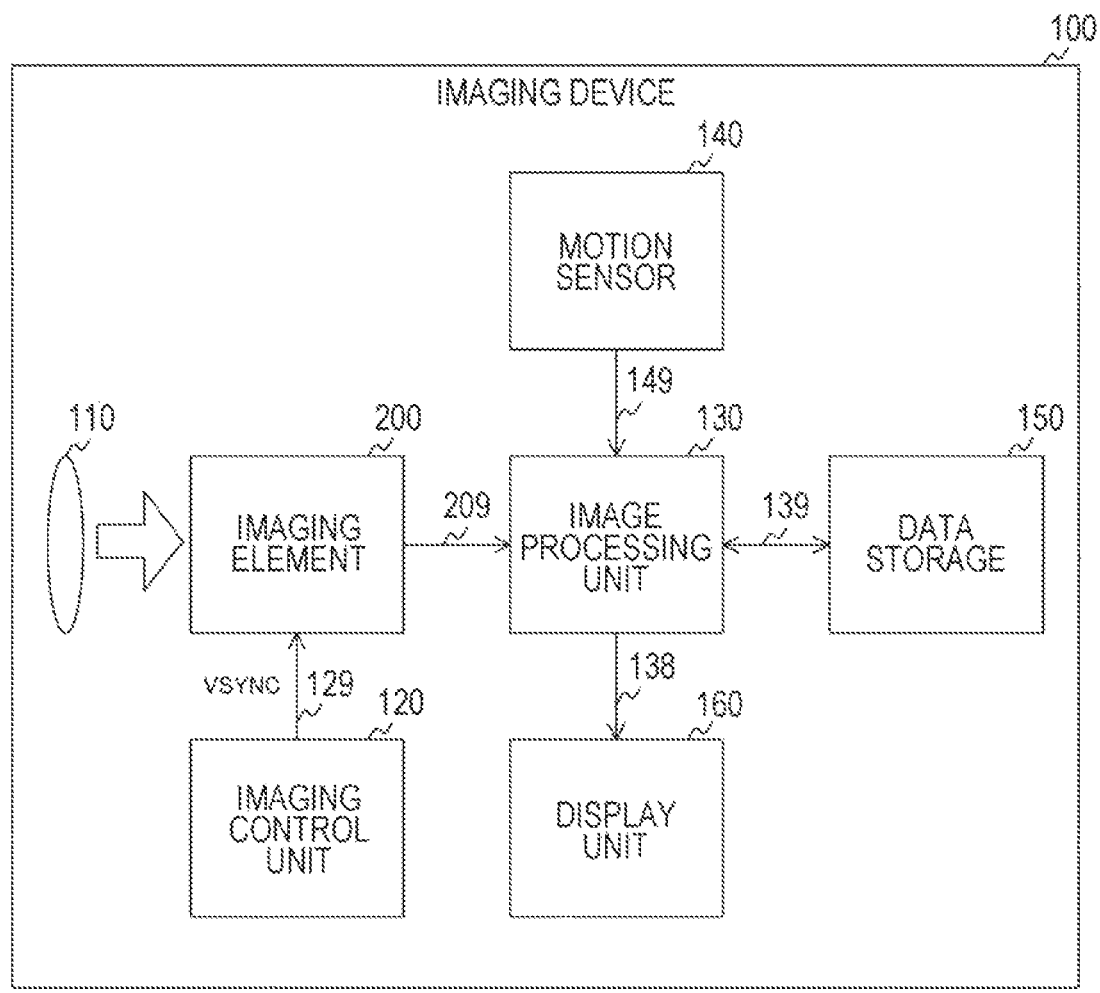
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 images moving image data including a plurality of image data in chronological order and includes an imaging lens 110, an imaging element 200, an imaging control unit 120, an image processing unit 130, a motion sensor 140, a data storage 150, and a display unit 160. Examples of the imaging device 100 include an information processing device having an imaging function such as a smartphone or a personal computer, and a digital camera.

The imaging lens 110 condenses light from a subject and guides the light to the imaging element 200.

The imaging control unit 120 controls the imaging element 200 to capture image data. The imaging control unit 120 starts supply of a vertical synchronization signal VSYNC to the imaging element 200 in response to a predetermined operation (such as pressing down of a shutter button) by a user, for example. The vertical synchronization signal VSYNC is a synchronization signal having a predetermined frequency (for example, 30 Hertz) indicating imaging timing, and is supplied via a signal line 129. Then, the imaging control unit 120 stops the supply of the vertical synchronization signal VSYNC in response to a predetermined operation (such as pressing down of a stop button) by the user.

The imaging element 200 images image data in synchronization with the vertical synchronization signal VSYNC. For example, a complementary MOS (CMOS) sensor is used as the imaging element 200. Then, the imaging element 200 supplies the imaged image data to the image processing unit 130 via a signal line 209.

The motion sensor 140 detects a motion of the imaging device 100. For example, an acceleration sensor or a gyro sensor is used as the motion sensor 140. A timing signal having a predetermined frequency indicating measurement timing is input to the motion sensor 140. The motion sensor 140 measures the motion every time a cycle of the timing signal passes, and supplies motion data indicating the measured value to the image processing unit 130 via a signal line 149.

The image processing unit 130 executes predetermined image processing for moving image data including the image data. The image processing unit 130 compresses the moving image data and supplies the moving image data together with the motion data from the motion sensor 140 to the data storage 150 via a signal line 139.

Furthermore, when reproduction or editing of the moving image data is instructed by the user, the image processing unit 130 reads the moving image data from the data storage 150 via the signal line 139 and decompresses the data. In the decompression, the image processing unit 130 converts a frame rate of the moving image data, using the motion data. Then, the image processing unit 130 supplies the decompressed moving image data to the display unit 160 via a signal line 138.

The data storage 150 records various data such as the moving image data and the motion data. The display unit 160 displays the moving image data.

Note that the imaging lens 110, the imaging element 200, the imaging control unit 120, the image processing unit 130, the motion sensor 140, the data storage 150, and the display unit 160 are arranged in one device but these constituent elements may be arranged in a plurality of devices in a distributed manner. For example, the imaging lens 110, the imaging element 200, and the imaging control unit 120 may be arranged in a camera module, and the image processing unit 130, the motion sensor 140, the data storage 150, and the display unit 160 may be arranged in an information processing device.

[Configuration Example of Imaging Element]

Figure 2:
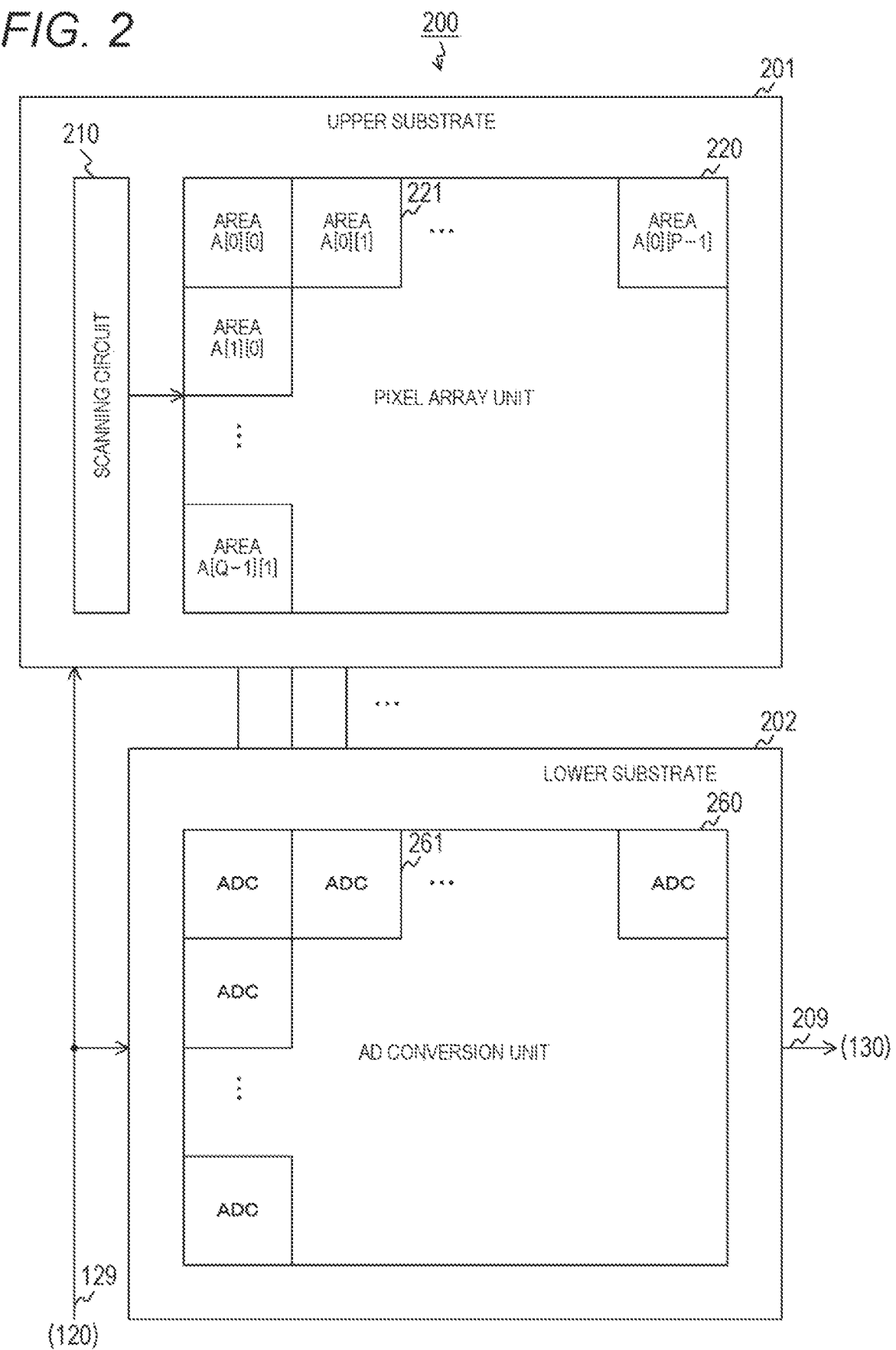
FIG. 2 is a block diagram illustrating a configuration example of an imaging element according to the first embodiment of the present technology.

FIG. 2 is a block diagram illustrating a configuration example of the imaging element 200 according to the first embodiment of the present technology. The imaging element 200 includes an upper substrate 201 and a lower substrate 202 that are stacked. A scanning circuit 210 and a pixel array unit 220 are arranged on the upper substrate 201, and an AD conversion unit 260 is arranged on the lower substrate 202.

The pixel array unit 220 is segmented into a plurality of square areas 221. These areas 221 are arrayed in a two-dimensional lattice manner. Then, in each of the areas 221, a plurality of pixels is arrayed. Note that the area 221 is an example of a segmented region described in the claims.

Here, assume that the number of areas 221 arrayed along a predetermined direction (a horizontal direction or the like)

is P (P is an integer) and the number of areas 221 arrayed along a direction perpendicular to the predetermined direction is Q (Q is an integer). An area 221 that is the p-th (p is an integer from 0 to P−1) area 221 in the horizontal direction and is the q-th (q is an integer from 0 to Q−1) area 221 in a vertical direction is hereinafter referred to as "area A [p][q]".

The same number of ADCs 261 as the areas 221 is provided in the AD conversion unit 260. The respective ADCs 261 are connected to the areas 221 different from one another in a one-to-one manner. Since the areas 221 are P×Q pieces, P×Q ADCs 261 are also arranged. Pixels in the area 221 generate analog pixel data and supply the analog pixel data to the corresponding ADC 261. The ADC 261 performs AD conversion for the analog pixel data to generate digital pixel data. A frame in which these digital pixel data are arrayed is output as an original frame to the image processing unit 130. Note that the ADC 261 is an example of an analog-digital converter described in the claims.

Note that, in the imaging element 200, the ADC 261 is arranged in each area 221, but the ADC 261 may be arranged in each column of the pixels.

Figure 3:
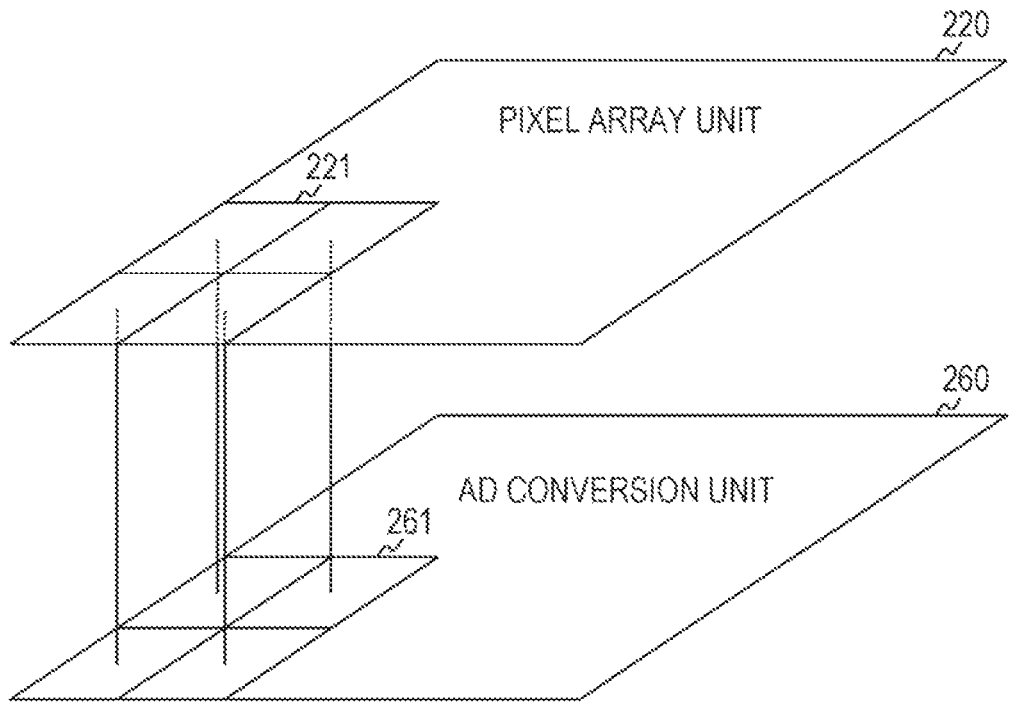
FIG. 3 is a perspective view illustrating an example of wiring between a pixel array unit and an AD conversion unit according to the first embodiment of the present technology.

FIG. 3 is a perspective view illustrating an example of wiring between the pixel array unit 220 and the AD conversion unit 260 according to the first embodiment of the present technology. The respective areas 221 are connected to the ADCs 261 directly below the ADCs 261 in a one-to-one manner by Cu—Cu connection or the like. In a case where the number of area ADCs is P×Q, the pixel array unit 220 and the AD conversion unit 260 are connected by P×Q wirings.

[Configuration Example of Pixel Array Unit]

Figure 4:
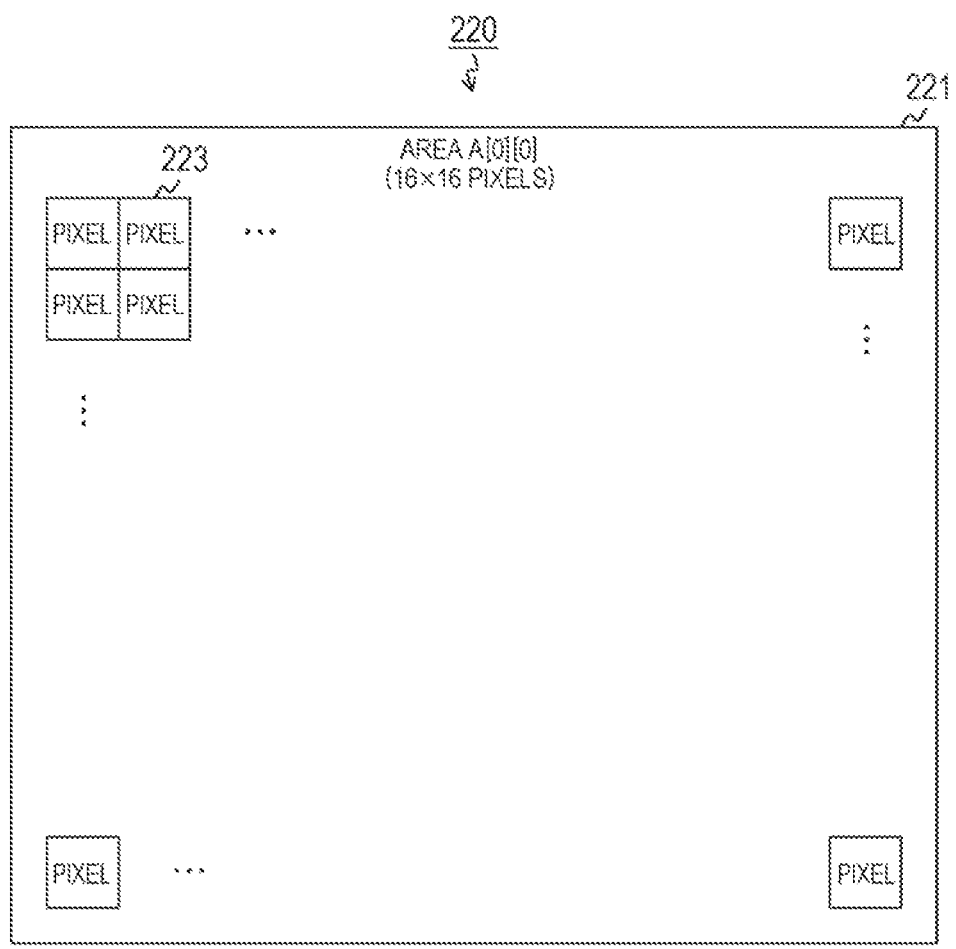
FIG. 4 is a plan view illustrating a configuration example of the pixel array unit according to the first embodiment of the present technology.

FIG. 4 is a plan view illustrating a configuration example of the pixel array unit 220 according to the first embodiment of the present technology. In an area A[0][0], for example, 256 pixels 223 of 16 rows×16 columns are arrayed in a two-dimensional lattice manner.

Configurations of the areas 221 other than the area A[0][0] are similar to the configuration of the area A[0][0].

Figure 5:
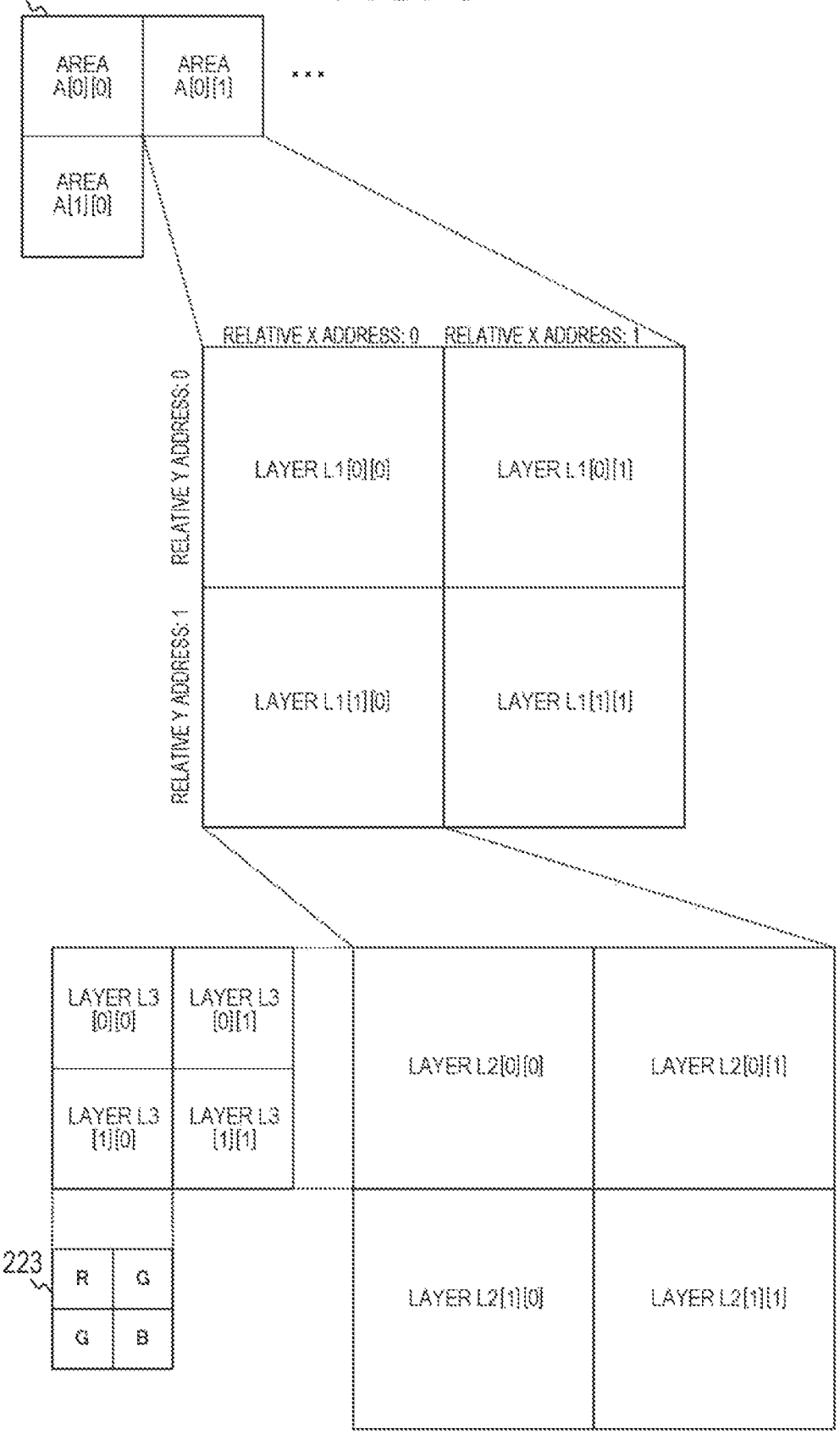
FIG. 5 is a diagram for describing a space dividing method according to the first embodiment of the present technology.

FIG. 5 is a diagram for describing a space dividing method according to the first embodiment of the present technology. Each of the areas 221 is divided by quadtree division. Here, the quadtree division means a method of recursively dividing a two-dimensional space into four regions. Each of the regions divided by the quadtree division is hereinafter referred to as a "layer".

For example, the pixels 223 of 16 rows×16 columns are arrayed in the area 221, and this area 221 is divided into four layers of a layer L1[0][0], a layer L1[0][1], a layer L1[1][0], and a layer L1[1][1]. x of a layer L1[y][x] represents a relative X address and y represents a relative Y address of the layer in the area 221.

Then, each of the layers L1[y][x] is divided into four layers of a layer L2[0][0], a layer L2[0][1], a layer L2[1][0,] and a layer L2[1][1]. x of a layer L2[y][x] represents a relative X address and y represents a relative Y address of the layer in the layer L1.

Hereinafter, similarly, each of the layers L2 is divided into four layers L3, and each of the layers L3 is divided into four layers L4 (in other words, the pixel 223). These pixels 223 are arrayed, for example, by a Bayer array. The hierarchical relationship of the layers L1, L2, L3, and L4 is such that the layer L1 is the highest, and the layers L2, L3, and L4 are lower in a descending order.

Furthermore, the relative X address of the pixel 223 in the area 221 is represented by, for example, "$b_{x1}b_{x2}b_{x3}b_{x4}$". $b_{x1}$ is a bit indicating the relative X address of the layer L1. $b_{x2}$, $b_{x3}$, and $b_{x4}$ are bits indicating the relative X addresses of the layers L2, L3, and L4. The relative Y address of the pixel 223 in the area 221 is represented by, for example, "$b_{y1}b_{y2}b_{y3}b_{y4}$". $b_{y1}$, $b_{y2}$, $b_{y3}$, and $b_{y4}$ are bits indicating the relative Y addresses of the layers L1, L2, L3, and L4.

Note that the area 221 is divided into the four layers L1 to L4, but the number of hierarchical levels is not limited to four.

The space is divided by the quadtree division in this manner, whereby the scanning circuit 210 can acquire the address of the pixel 223 by quadtree search. Here, the quadtree search is a method of searching a region divided by the quadtree division by recursive processing.

FIG. 6 is a diagram illustrating an example of an exposure order of the pixels in the area 221 according to the first embodiment of the present technology. The numerical value in FIG. 6 indicates the order of exposure for each pixel. For example, the exposure orders of "0" to "255" are assigned to the respective 256 pixels of 16 rows×16 columns. Note that the number of pixels in the area 221 is not limited to 256.

The scanning circuit 210 acquires the address of the layer to be exposed by the quadtree search. For example, the scanning circuit 210 acquires (0, 0) as the relative address ($b_{y3}$, $b_{x3}$) of L3 and calls a subroutine for acquiring the relative address of the layer L2. Next, the scanning circuit 210 acquires (1,1) as the relative address ($b_{y3}$, $b_{x3}$) of L3 and calls a subroutine for acquiring the relative address of the layer L2. Then, the scanning circuit 210 acquires (0, 1) as the relative address ($b_{y3}$, $b_{x3}$) of L3 and calls a similar subroutine, and acquires (1, 0) as the relative address ($b_{y3}$, $b_{x3}$) of L3 and calls a similar subroutine.

In the subroutine for acquiring the relative address of the layer L2, the scanning circuit 210 acquires (0, 0) as the relative address ($b_{y2}$, $b_{x2}$) of L2 and calls a subroutine for acquiring the relative address of the layer L1. Next, the scanning circuit 210 acquires (1, 1) as the relative address ($b_{y2}$, $b_{x2}$) of L2 and calls a subroutine for acquiring the relative address of the layer L1. Then, the scanning circuit 210 acquires (0, 1) as the relative address ($b_{y2}$, $b_{x2}$) of L2 and calls a similar subroutine, and acquires (1, 0) as the relative address ($b_{y2}$, $b_{x2}$) of L2 and calls a similar subroutine.

In the subroutine for acquiring the relative address of the layer L1, the scanning circuit 210 acquires (0, 0) as the relative address ($b_{y1}$, $b_{x1}$) of L1 and calls a subroutine for acquiring the relative address of the layer L4. Next, the scanning circuit 210 acquires (1, 1) as the relative address ($b_{y1}$, $b_{x1}$) of L1 and calls a subroutine for acquiring the relative address of the layer L4. Then, the scanning circuit 210 acquires (0, 1) as the relative address ($b_{y1}$, $b_{x1}$) of L1 and calls a similar subroutine, and acquires (1, 0) as the relative address ($b_{y1}$, $b_{x1}$) of L1 and calls a similar subroutine.

In the subroutine for acquiring the relative address of the layer L4, the scanning circuit 210 acquires (0, 0) as the relative address ($b_{y4}$, $b_{x1}$) of the layer L4. Then, the scanning circuit 210 starts exposure of the pixel of the relative address (Y, X) in the area 221. Next, the scanning circuit 210 sequentially acquires (0, 1), (1, 0), and (1, 1) as the relative address ($b_{y4}$, $b_{x4}$) of the layer L4 and sequentially starts exposure of the pixels corresponding to the relative addresses. In this manner, the address is obtained by recursive quadtree search.

Then, the scanning circuit 210 terminates the exposure of each of the pixels in the same order as the exposure start order, and outputs the pixel data. The control of obtaining the address of the layer to be exposed by the quadtree search and exposing the layer in this way is hereinafter referred to as "Q (quad)-tree scan". By the Q-tree scanning, temporal and spatial uniformity of the exposure timing of the pixels can be secured.

Next, in decompressing data, the image processing unit 130 divides a pixel group within each area 221 in the original frame into K groups (K is an integer of 2 or more) having consecutive exposure orders. For example, assume that the number of pixels in the area 221 is "256" and K is "4". In this case, the pixel group is divided into a group of the 0th to 63rd exposure orders, a group of the 64th to 127th exposure orders, a group of the 128th to 191st exposure orders, and a group of the 192nd to 255th exposure orders.

Then, the image processing unit 130 arrays the pixel data in each group and generates one image data as a subframe for each group. As a result, K (for example, "4") subframes are generated from one original frame. The image processing unit 130 performs division for each original frame in the moving image data, thereby making the frame rate K times. Note that the number of pixels (resolution) of the subframe is 1/K of the original frame. For example, moving image data having the resolution of 3840×2160 pixels and an original frame rate of 30 frames per second (fps) is converted into moving image data having the resolution of (3840/2)×(2160/2) pixels and an output frame rate of 120 fps. Hereinafter, the frame rate before the frame rate conversion will be referred to as an "original frame rate" and the frame rate after the conversion will be referred to as an "output frame rate".

FIG. 7 is a diagram illustrating a region corresponding to a first subframe according to the first embodiment of the present technology. When imaging is started, the scanning circuit 210 sequentially exposes the pixels in the 0th to 63rd exposure orders in the first group in a fixed order. With the exposure, the pixel data of the 64 pixels surrounded by the thick frame is read out. As illustrated in FIG. 7, upper left one layer L3 in each layer L2 is exposed. Four layers L3 are exposed in each layer L1 as viewed from the layer L1. In a case where the number of divisions K is "4", the first first subframe is generated from the pixel data of these parts. Since the number of areas 221 is P×Q, the number of pixels of the subframe is P×Q×64 pixels. Note that the pixel data in these first groups is an example of first pixel data described in the claims.

Here, raster scanning is performed in a general imaging element, but in the raster scanning, the exposure timing temporally and spatially deviates to a part in the area 221. For example, in the raster scanning, 64 pixels of 4 rows×16 columns are exposed from the 0th to 63rd orders, and the exposure timing deviates to these 4 rows. Random scanning of randomly selecting and exposing pixels is also known, but in this random scanning, uniformity is more secured than the raster scanning but the exposure timing still deviates.

In contrast, in the imaging element 200, as illustrated in FIG. 7, the 0th to 63rd pixels are uniformly distributed in the area 221, and the temporal and spatial uniformity of the exposure timing can be secured.

Figure 8:
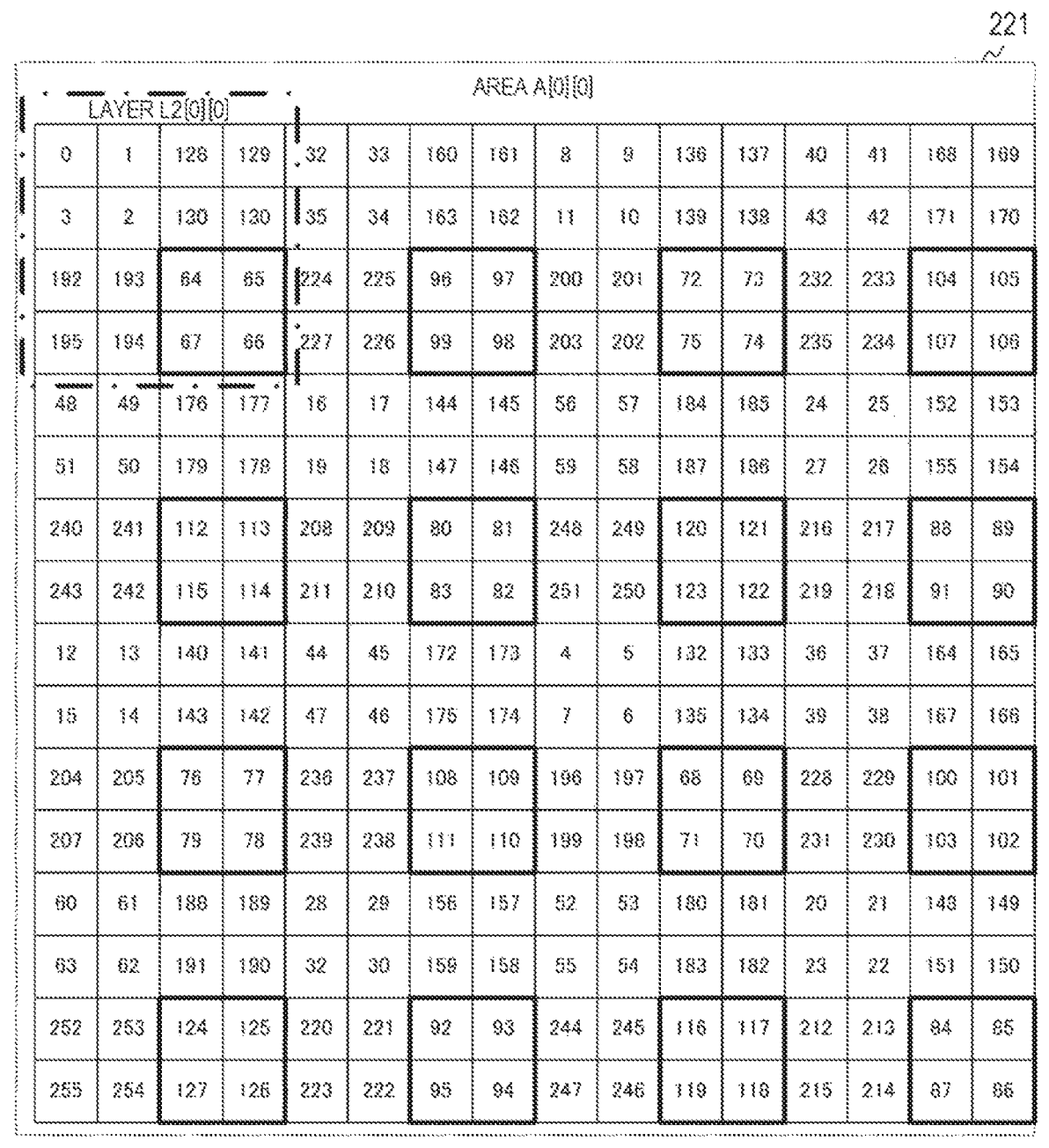

FIG. 8 is a diagram illustrating a region corresponding to a second subframe according to the first embodiment of the present technology. After exposing the 63rd pixel, the scanning circuit 210 sequentially exposes the pixels in the 64th to 127th exposure orders in the second group. With the exposure, the pixel data of the 64 pixels surrounded by the thick frame is read out. As illustrated in FIG. 8, the lower right layer L3 in each layer L2 is exposed. In a case where the number of divisions K is "4", the second second subframe is generated from the pixel data of these parts. Note that the pixel data in these second groups is an example of second pixel data described in the claims.

FIG. 9 is a diagram illustrating a region corresponding to a third subframe according to the first embodiment of the present technology. After exposing the 127th pixel, the scanning circuit 210 sequentially exposes the pixels in the 128th to 191st exposure orders in the third group. With the exposure, the pixel data of the 64 pixels surrounded by the thick frame is read out. As illustrated in FIG. 9, the upper right layer L3 in each layer L2 is exposed. In a case where the number of divisions K is "4", the third third subframe is generated from the pixel data of these parts.

FIG. 10 is a diagram illustrating a region corresponding to a fourth subframe in the first embodiment of the present technology. After exposing the 191st pixel, the scanning circuit 210 sequentially exposes the pixels in the 192nd to 255th exposure orders in the fourth group. With the exposure, the pixel data of the 64 pixels surrounded by the thick frame is read out. As illustrated in FIG. 10, the lower left layer L3 in each layer L2 is exposed. In a case where the number of divisions K is "4", the fourth fourth subframe is generated from the pixel data of these parts.

Note that the layers L1 and L2 higher than the layer L3 are examples of divided regions described in the claims. Furthermore, the layer L3 is an example of a partial region described in the claims. "4" that is the number of the layers L3 to be exposed in the layer L1 in each subframe and "1" that is the number of the layers L3 to be exposed in the layer L2 are examples of predetermined numbers described in the claims.

Figure 11:
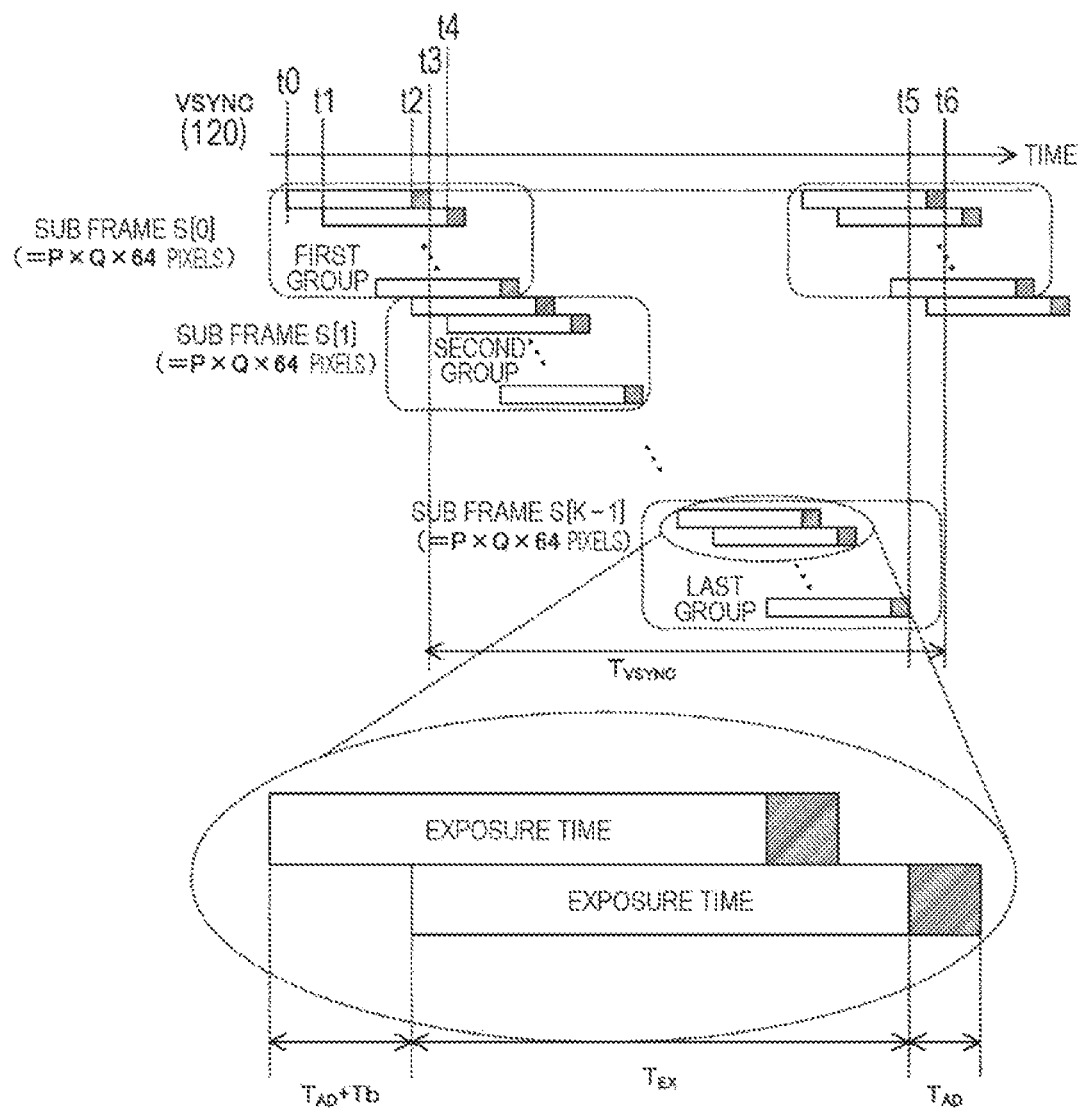
FIG. 11 is an example of a timing chart illustrating exposure timing according to the first embodiment of the present technology.

FIG. 11 is an example of a timing chart illustrating exposure timing according to the first embodiment of the present technology. In FIG. 11, the length of a white portion indicates an exposure time $T_{EX}$ of a pixel. Furthermore, the length of a shaded portion indicates a time $T_{AD}$ required for AD conversion of pixel data.

The scanning circuit 210 drives the respective pixels in the 0th exposure order of the P×Q areas 221 at timing t0 that is earlier by $T_{EX}+T_{AD}$ than rising timing t3 of the vertical synchronization signal VSYNC to start exposure. Then, at timing t1 when the time $T_{AD}$+Tb has passed from the timing t0, the scanning circuit 210 drives the respective pixels in the first exposure order of the P×Q areas 221 to start the exposure. Then, at timing t2 when $T_{EX}$ has passed from the timing t0, the scanning circuit 210 terminates the exposure of the 0th pixel and outputs the pixel data. At timing t4 when $T_{EX}$ has passed from the timing t1, the scanning circuit 210 terminates the exposure of the first pixel and outputs the pixel data. Hereinafter, the third and subsequent pixels are sequentially exposed. Then, at timing t5, the AD conversion of the last pixels in the respective areas 221 is completed. At timing t6 when a cycle $T_{VSYNC}$ of the vertical synchronization signal VSYNC has passed from the timing t3, the AD conversion of the first pixels of the next frame is completed.

The pixel group inside each area 221 is divided into K groups having consecutive exposure orders, and one subframe is generated for each of the groups. For example, in a case where the number of pixels in the area 221 is "256" and K is "4", a first subframe S[0] is generated from the 64 pixels in the 0th to 63rd exposure orders (in other words, the first group). Next, a subframe S[1] is generated from the 64 pixels in the 64th to 127th exposure orders (in other words, the second group). Hereinafter, similarly, a subframe S[2] to a subframe S[K−1] (S[3]) are generated from the original frame. Since the number of areas 221 is P×Q, the number of pixels of each subframe is p×Q×64 pixels.

Here, a value that satisfies the following expression is set to Tb.

$$(T_{AD}+Tb) \times M = T_{VSYNC}$$

In the above expression, M is the number of pixels (for example, 256) in the area 221.

By setting Tb in this manner, a blank period that is a time from timing when the last pixel data is output in the area 221 to the rising timing of the vertical synchronization signal VSYNC can be made substantially zero.

In a general imaging element that performs the raster scanning, Tb is set to substantially zero from the viewpoint of reduction of focal plane distortion, and as a result, a blank interval becomes longer. Therefore, the exposure timing concentrates during a period outside the blank period in the cycle $T_{VSYNC}$ of the vertical synchronization signal VSYNC.

In contrast, in the imaging element 200, the blank period is made substantially zero, as described above. Therefore, the exposure timing is uniformly distributed in the cycle $T_{VSYNC}$. Therefore, the temporal uniformity of the exposure time of the subframes can be secured. Note that, since the imaging element 200 performs the Q-tree scanning, the focal plane distortion does not occur.

[Configuration Example of Image Processing Unit]

Figure 12:
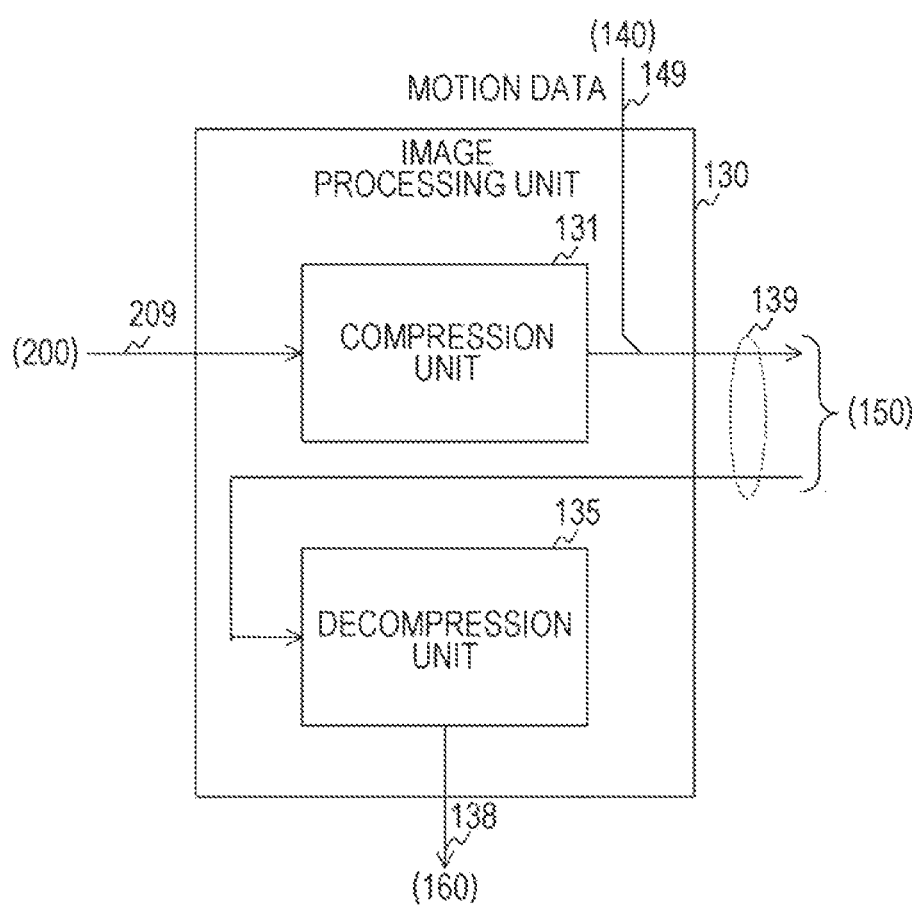
FIG. 12 is a block diagram illustrating a configuration example of an image processing unit according to the first embodiment of the present technology.

FIG. 12 is a block diagram illustrating a configuration example of the image processing unit 130 according to the first embodiment of the present technology. The image processing unit 130 includes a compression unit 131 and a decompression unit 135.

The compression unit 131 compresses the moving image data from the imaging element 200. The compressed moving image data is recorded together with the motion data in the data storage 150.

The decompression unit 135 reads the compressed moving image data from the data storage 150 and decompresses the compressed moving image data according to an operation of the user. The decompression unit 135 supplies the decompressed moving image data to the display unit 160.

[Configuration Example of Compression Unit]

Figure 13:
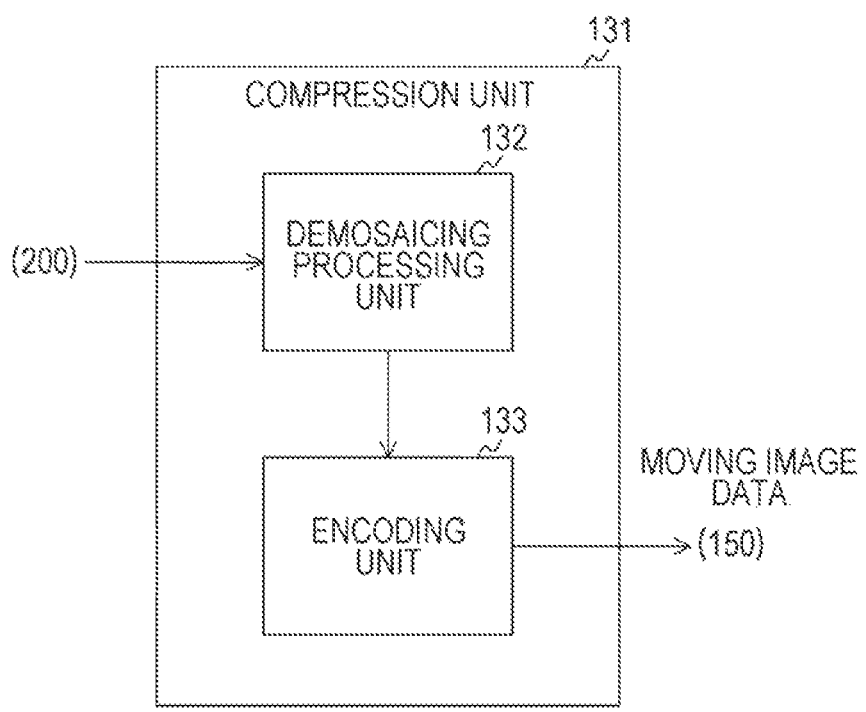
FIG. 13 is a block diagram illustrating a configuration example of a compression unit according to the first embodiment of the present technology.

FIG. 13 is a block diagram illustrating a configuration example of the compression unit 131 according to the first embodiment of the present technology. The compression unit 131 includes a demosaicing processing unit 132 and an encoding unit 133.

The demosaicing processing unit 132 performs demosaicing processing for the original frame in the moving image data. Here, the demosaicing processing is processing of interpolating, for each pixel, color information insufficient for the pixel from a periphery to generate a full-color image having color information of red (R), green (G), and blue (B) for each pixel. The demosaicing processing unit 132 supplies the original frame after demosaicing to the encoding unit 133.

The encoding unit 133 compresses (in other words, encodes) moving image data using a predetermined codec. For example, a codec conforming to the moving picture experts group (MPEG)-2 or H.264/MPEG-4 advanced video coding (AVC) standards is used. Alternatively, a codec conforming to MPEG high-performance video coding (HVC) or display stream compression (DSC) standards is used. The encoding unit 133 records the compressed moving image data in the data storage 150.

[Configuration Example of Decompression Unit]

Figure 14:
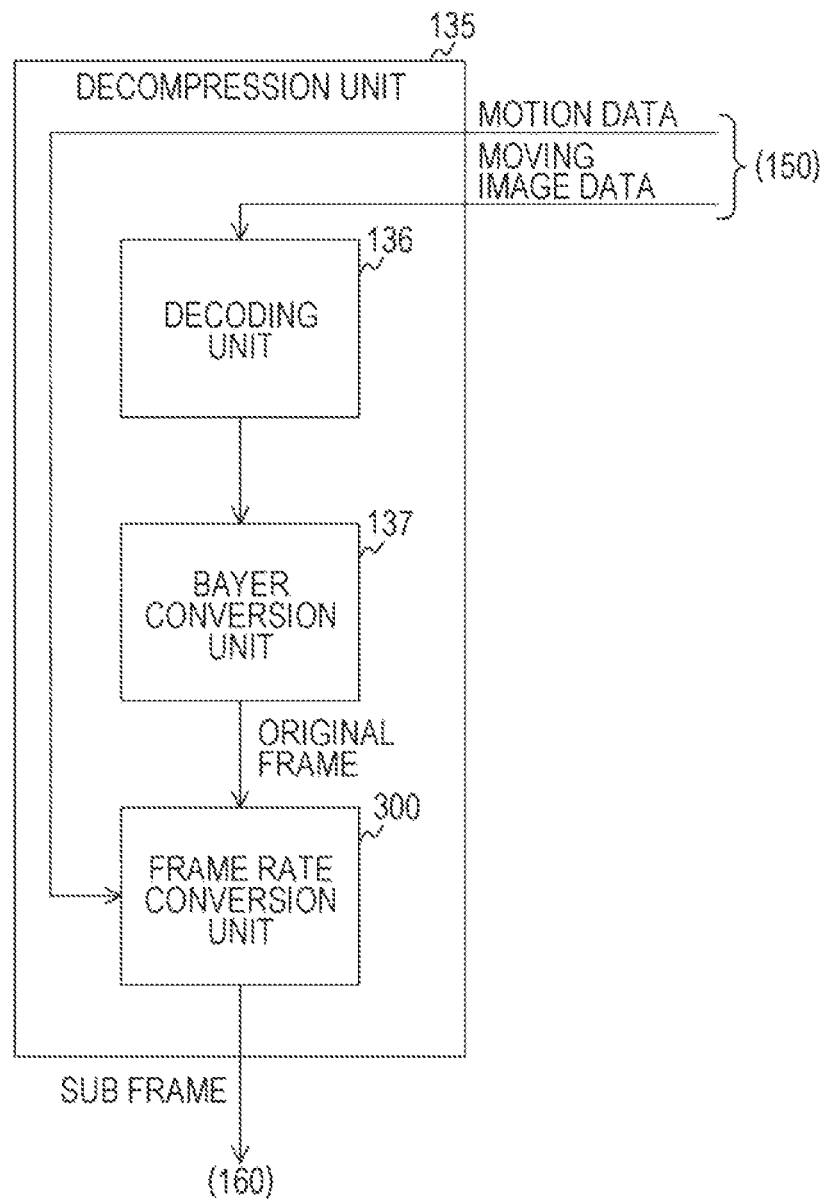
FIG. 14 is a block diagram illustrating a configuration example of a decompression unit according to the first embodiment of the present technology.

FIG. 14 is a block diagram illustrating a configuration example of the decompression unit 135 according to the first embodiment of the present technology. The decompression unit 135 includes a decoding unit 136, a Bayer conversion unit 137, and a frame rate conversion unit 300.

The decoding unit 136 decompresses (decodes) the compressed moving image data using a codec similar to the codec of the encoding unit 133. The decoding unit 136 supplies the decompressed moving image data to the Bayer conversion unit 137.

The Bayer conversion unit 137 converts the full-color original frame in the moving image data into a Bayer array image. In other words, reverse process to the demosaicing processing is performed. The Bayer conversion unit 137 supplies each original frame after conversion to the frame rate conversion unit 300.

The frame rate conversion unit 300 converts the frame rate of the moving image data. The frame rate conversion unit 300 performs camera shake correction using the motion data in the frame rate conversion. The frame rate conversion unit 300 outputs the moving image data including subframes to the display unit 160.

Note that the image processing unit 130 decompresses the original frame after compression and converts the frame rate. However, the image processing unit 130 may perform only conversion of the frame rate of the original frame from the imaging element 200 without performing compression and decompression. In this case, the compression unit 131, the decoding unit 136, and the Bayer conversion unit 137 become unnecessary.

[Configuration Example of Frame Rate Conversion Unit]

Figure 15:
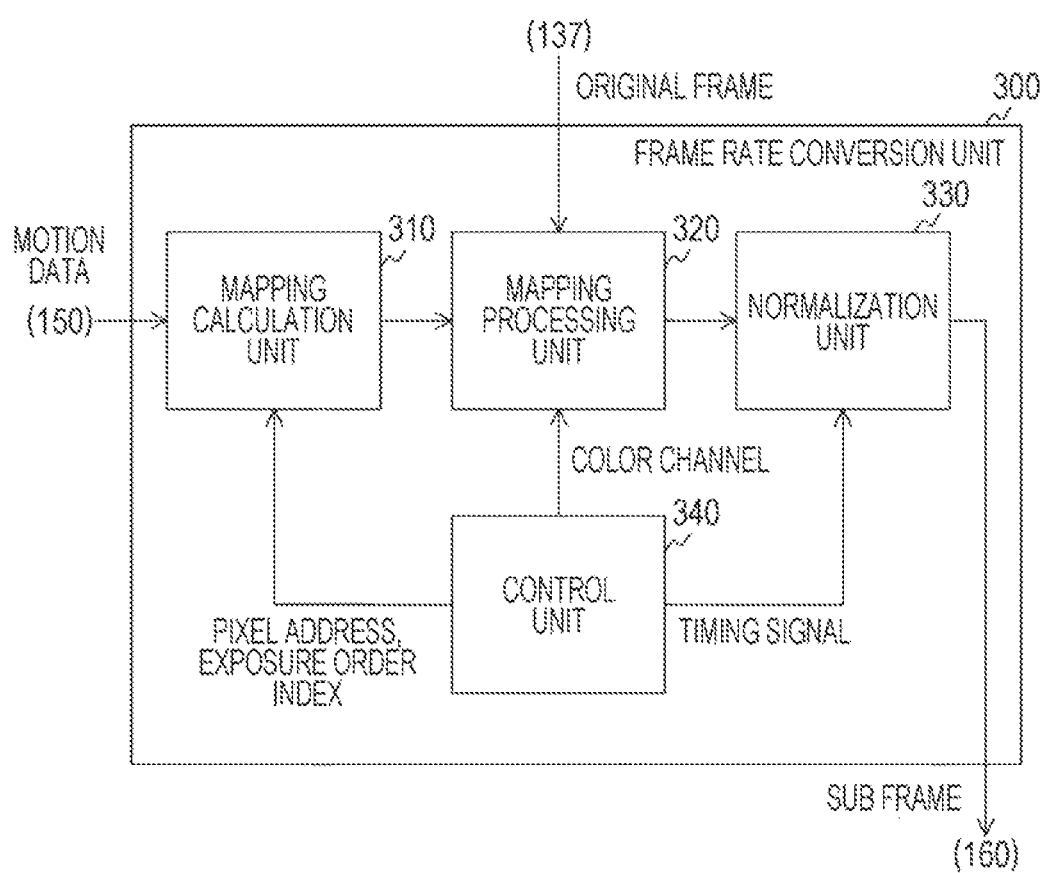
FIG. 15 is a block diagram illustrating a configuration example of a frame rate conversion unit according to the first embodiment of the present technology.

FIG. 15 is a block diagram illustrating a configuration example of the frame rate conversion unit 300 according to the first embodiment of the present technology. The frame rate conversion unit 300 includes a mapping calculation unit 310, a mapping processing unit 320, a normalization unit 330, and a control unit 340.

The mapping calculation unit 310 calculates mapping data on the basis of a motion indicated by the motion data. Here, the mapping data is data indicating an address of a mapping destination when each of the pixels in the original frame is mapped into the subframe on the basis of a motion amount obtained from the motion data. This motion amount is calculated from a measured value of acceleration or angular velocity measured by the motion sensor 140. In the calculation of the motion amount, interpolation such as linear interpolation is performed as necessary. The mapping calculation unit 310 supplies the mapping data to the mapping processing unit 320.

The mapping processing unit 320 maps each of the pixels in the original frame on the basis of the mapping data. The mapping processing unit 320 performs mapping for each of the K groups and supplies the data after mapping of the each group to the normalization unit 330 as a subframe. With the mapping, the frame rate is converted.

The normalization unit 330 performs predetermined normalization processing for the subframe. The normalization unit 330 supplies the subframe after normalization processing to the display unit 160.

The control unit 340 controls the entire frame rate conversion unit 300. For example, the control unit 340 supplies, for each pixel, a pixel address and an exposure order index indicating the exposure order to the mapping calculation unit 310. Furthermore, the control unit 340 supplies R, G, and B color channels to the mapping processing unit 320. Furthermore, the control unit 340 supplies a predetermined timing signal to the normalization unit 330.

[Configuration Example of Mapping Processing Unit]

Figure 16:
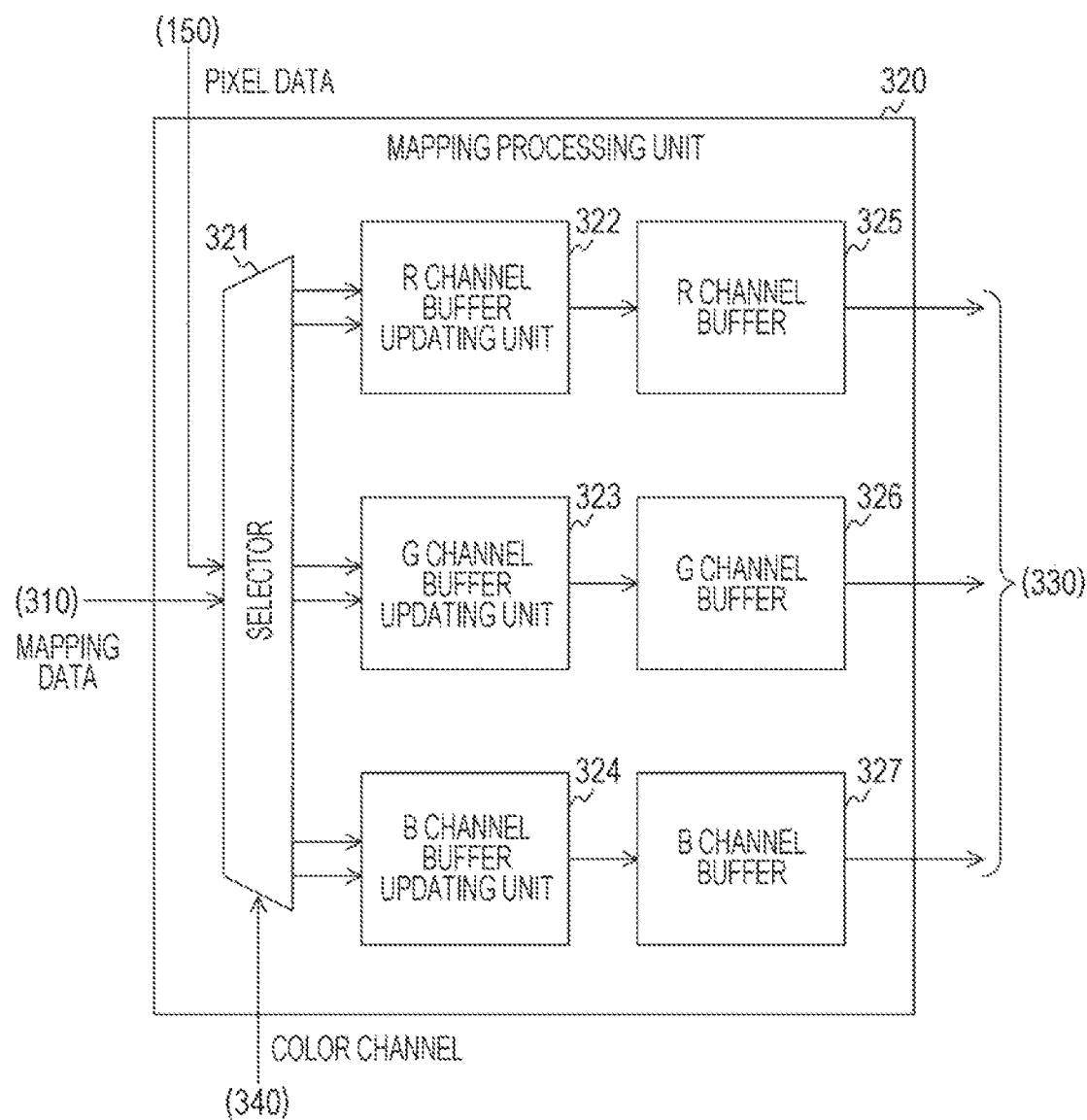
FIG. 16 is a block diagram illustrating a configuration example of a mapping processing unit according to the first embodiment of the present technology.

FIG. 16 is a block diagram illustrating a configuration example of the mapping processing unit 320 according to the first embodiment of the present technology. The mapping processing unit 320 includes a selector 321, an R channel buffer updating unit 322, a G channel buffer updating unit 323, a B channel buffer updating unit 324, an R channel buffer 325, a G channel buffer 326, and a B channel buffer 327.

The selector 321 switches an output destination of the pixel data and the mapping data from the data storage 150 and the mapping calculation unit 310 according to the color channel from the control unit 340. In a case where an R channel is specified, the selector 321 supplies the pixel data and the mapping data to the R channel buffer updating unit 322. Furthermore, in a case where a G channel is specified, the selector 321 supplies the pixel data and the mapping data to the G channel buffer updating unit 323, and in a case where a B channel is specified, the selector 321 supplies the pixel data and the mapping data to the B channel buffer updating unit 324.

The R channel buffer updating unit 322 updates the R channel buffer 325 with the pixel data from the selector 321 according to the mapping data. The G channel buffer updating unit 323 updates the G channel buffer 326 with the pixel data from the selector 321 according to the mapping data. The B channel buffer updating unit 324 updates the B channel buffer 327 with the pixel data from the selector 321 according to the mapping data.

The R channel buffer 325 holds a working buffer and a weight table of the R channel. The working buffer and the weight table will be described below. Furthermore, the G channel buffer 326 holds a working channel and a weight table of the G channel, and the B channel buffer 327 holds a working buffer and a weight table of the B channel. Data held in these buffers is read out by the normalization unit 330 in a second stage.

Figure 17:
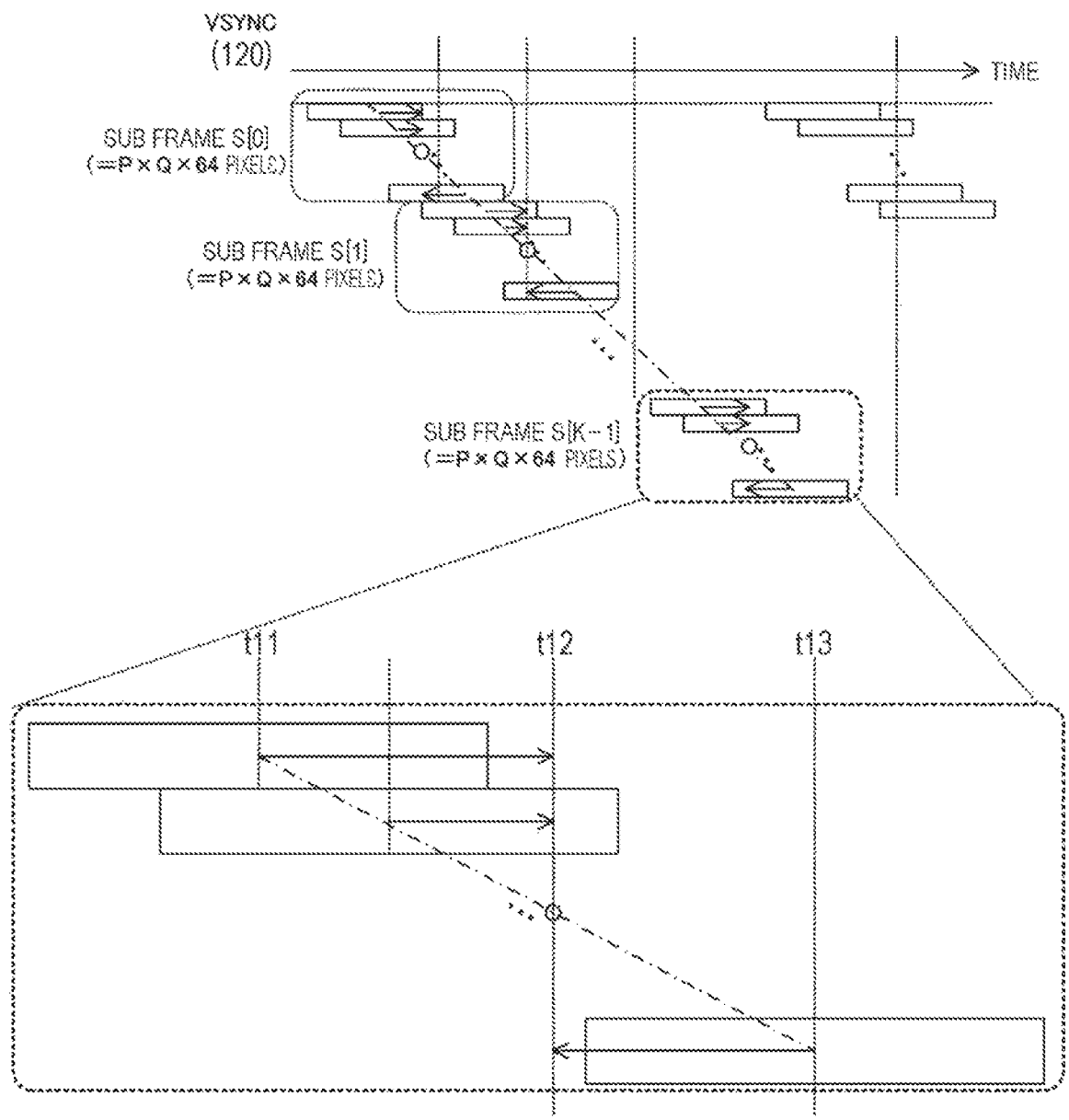
FIG. 17 is a diagram illustrating a relationship between an exposure center and a motion vector according to the first embodiment of the present technology.

FIG. 17 is a diagram illustrating a relationship between an exposure center and a motion vector according to the first embodiment of the present technology. The mapping calculation unit 310 sequentially focuses on the pixel data in the subframe and acquires a motion vector indicating the motion amount and a motion direction of the imaging device 100 from one to the other of an exposure center time of the pixel data of interest and an exposure center time of the subframe on the basis of the motion data. In FIG. 17, a circle represents an exposure center time of a subframe.

For example, in a case where the exposure center time of the pixel data firstly exposed in the subframe is t11 and the exposure center time t12 of the subframe is after t11, a motion vector indicating a motion from t11 to t12 can be obtained. In a case where the exposure center time of the last pixel data exposed in the subframe is t13 and t12 is before t13, a motion vector indicating a motion from t13 to t12 is obtained for the pixel data.

Figure 18:
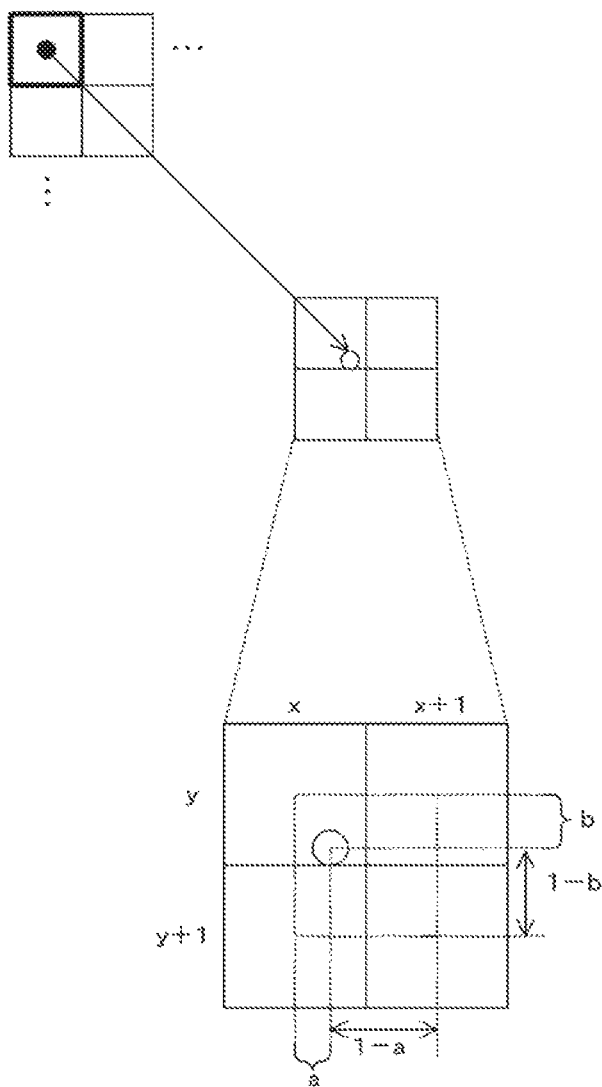
FIG. 18 is a diagram illustrating an example of a motion vector according to the first embodiment of the present technology.

FIG. 18 is a diagram illustrating an example of the motion vector according to the first embodiment of the present technology. As described above, the mapping calculation unit 310 calculates the motion vector for each pixel. In FIG. 18, the arrow represents the motion vector obtained for the pixel of interest surrounded by the thick frame. The black circle represents a start point of the motion vector, and the address of the motion vector is the address of the pixel of interest. Furthermore, the white circle represents an end point of the motion vector. Here, it is assumed that the resolution of the motion sensor 140 is higher than the resolution of the imaging element 200. For example, the resolution of the motion sensor 140 in a certain direction is about $2^{18}$, whereas the resolution of the imaging element 200 in that direction is $2^{12}$ to $2^{13}$. Therefore, the address of the end point is calculated with higher accuracy than the address of the pixel. For example, the address of the pixel is expressed by an integer value, whereas the address of the end point of the motion vector is expressed by a real number having a fixed number of digits.

Therefore, it is assumed that a ratio of a distance from an X address (integer) of the pixel including the end point to the X address (real number) of the end point, and a distance from the X address (real number) of the end point to the X address (integer) of the pixel to the right of the end point is a:1−a. Furthermore, it is assumed that a ratio of a distance from a Y address (integer) of the pixel including the end point to the Y address (real number) of the end point, and a distance from the Y address (real number) of the end point to the Y address (integer) of the pixel directly under the end point is b:1−b. Here, a and b are real numbers from 0 to 1, exclusive of 1.

The mapping processing unit 320 updates the working buffers and the weight tables including the R channel buffer 325, the G channel buffer 326, and the B channel buffer 327 using values of the pixel data by the following expressions:

$$\text{work\_buff}(c,y,x) = \text{work\_buff}(c,y,x) + (1-a)(1-b) * \text{src\_pix}(c,y,x)$$

$$\text{work\_buff}(c,y,x+1) = \text{work\_buff}(c,y,x+1) + a(1-b) * \text{src\_pix}(c,y,x)$$

$$\text{work\_buff}(c,y+1,x) = \text{work\_buff}(c,y+1,x) + b(1-a) * \text{src\_pix}(c,y,x)$$

$$\text{work\_buff}(c,y+1,x+1) = \text{work\_buff}(c,y+1,x+1) + ab * \text{src\_pix}(c,y,x)$$

$$\text{weight\_table}(c,y,x) = \text{weight\_table}(c,y,x) + (1-a)(1-b)$$

$$\text{weight\_table}(c,y,x+1) = \text{weight\_table}(c,y,x+1) + a(1-b)$$

$$\text{weight\_table}(c,y+1,x) = \text{weight\_table}(c,y+1,x) + b(1-a)$$

$$\text{weight\_table}(c,y+1,x+1) = \text{weight\_table}(c,y+1,x+1) + ab$$

In the above expressions, c is a color channel and represents one of R, G, and B. x and y represent the horizontal and vertical addresses of the pixel data. work_buff( ) represents an integrated value of the color information held in the working buffer. src_pix( ) represents the pixel data input to the mapping processing unit 320. weight_table( ) represents weight data held in the weight_table. This weight data indicates the number of times of integration for each pixel.

Figure 19:
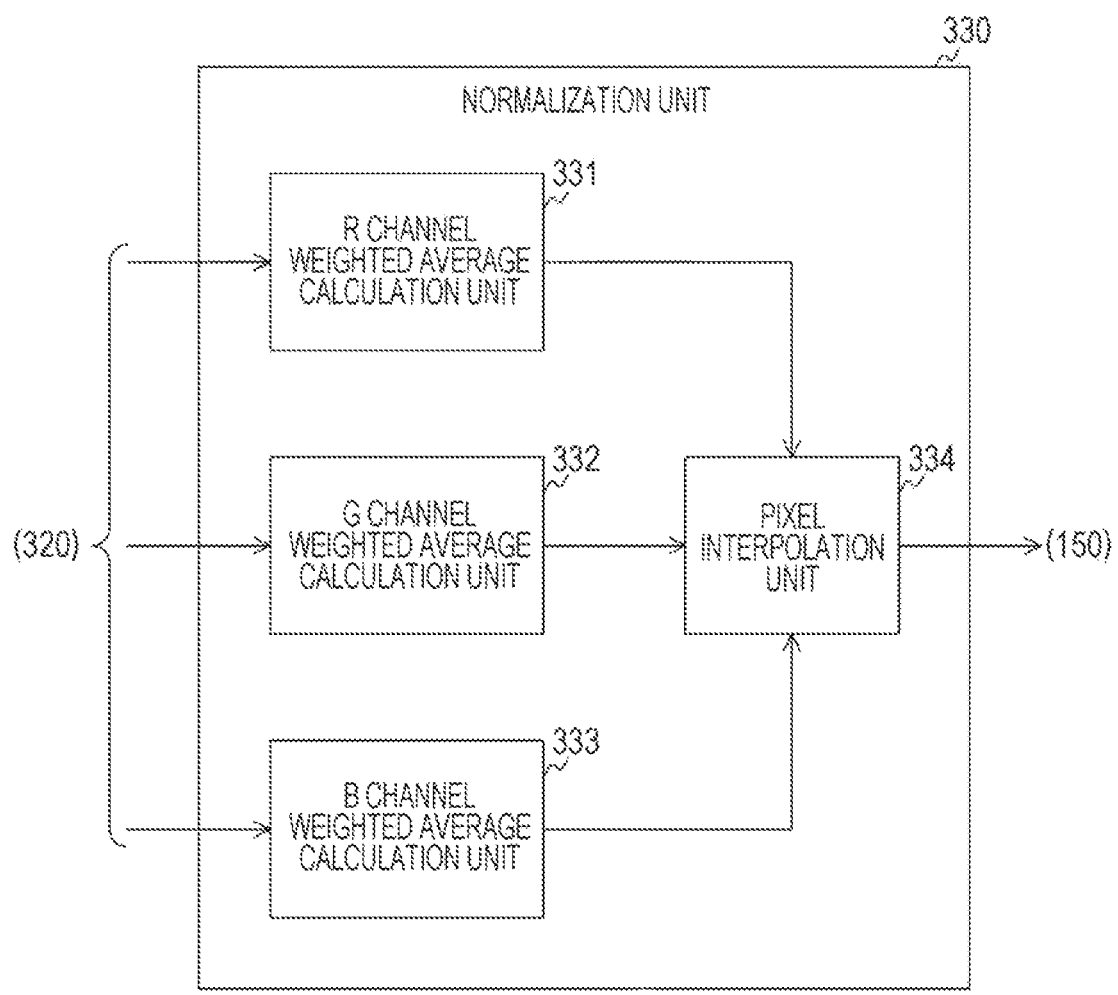
FIG. 19 is a block diagram illustrating a configuration example of a normalization unit according to the first embodiment of the present technology.

FIG. 19 is a block diagram illustrating a configuration example of the normalization unit 330 according to the first embodiment of the present technology. The normalization unit 330 includes an R channel weighted average calculation unit 331, a G channel weighted average calculation unit 332, a B channel weighted average calculation unit 333, and a pixel interpolation unit 334.

The R channel weighted average calculation unit 331 calculates a weighted average for R pixel data. The R channel weighted average calculation unit 331 refers to the working buffer and determines whether or not work_table (c, y, x) is larger than a predetermined value E (E is a real number).

In a case where work_table (c, y, x) is larger than the predetermined value E, the R channel weighted average calculation unit 331 calculates the weighted average by referring to the working buffer and the weight_table by the following expression:

$$\text{work\_buff}(c,y,x) = \text{work\_buff}(c,y,x) / \text{weight\_table}(c,y,x)$$

Then, the R channel weighted average calculation unit 331 sets a logical value "1" indicating a valid pixel to valid_pixel_flag (c, y, x) that is a flag indicating whether or not a valid pixel.

On the other hand, in a case where work_table (c, y, x) is equal to or less than the predetermined value E, the R channel weighted average calculation unit 331 outputs a logical value "0" indicating a defective pixel to valid_pixel_flag (c, y, x). The R channel weighted average calculation unit 331 executes similar processing for all the R pixel data.

The G channel weighted average calculation unit 332 calculates a weighted average for G pixel data. The B channel weighted average calculation unit 333 calculates a weighted average for B pixel data. Processing of the G channel weighted average calculation unit 332 and the B channel weighted average calculation unit 333 is similar to the processing of the R channel weighted average calculation unit 331 except that processing is performed for the G and B channels.

The R channel weighted average calculation unit 331, the G channel weighted average calculation unit 332, and the B channel weighted average calculation unit 333 supply valid_pixel_flag (c, y, x) and work_buff (c, y, x) of all the pixels to the pixel interpolation unit 334.

The pixel interpolation unit 334 interpolates a defective pixel using surrounding information. The pixel interpolation unit 334 sequentially focuses all the pixels and obtains values of valid_pixel_flag(y, x) of the pixels. valid_pixel_flag (y, x) of "1" is acquired in a case where valid_pixel_flag (R, y, x), valid_pixel_flag (G, y, x), and valid_pixel_flag (B, y, x) are all logical values "1". Meanwhile, valid_pixel_flag (y, x) of a logical value "0" is acquired otherwise.

Then, the pixel interpolation unit 334 performs calculation expressed by the following expressions for the pixel of interest. A filter size of a Gaussian filter used in this calculation is set to a predetermined initial value (for example, 3×3 pixels).

[Math. 1]
$$\text{sum\_pix}(c, y, x) = \sum_{i=-1}^{1} \sum_{j=-1}^{1} \text{gaussian\_filter}(i, j) \cdot \text{valid\_pixel\_flag}(y+i, x+j) \cdot \text{work\_buff}(c, y+i, x+j) \quad \text{Expression 1}$$

[Math. 2]
$$\text{sum\_weight}(c, y, x) = \sum_{i=-1}^{1} \sum_{j=-1}^{1} \text{gaussian\_filter}(i, j) \cdot \text{valid\_pixel\_flag}(y+i, x+j) \quad \text{Expression 2}$$

In Expressions 1 and 2, Gaussian filter (i, j) is a function that returns a coefficient at a position (i, j) in the Gaussian filter. Furthermore, i is a relative position in the vertical direction within the Gaussian filter, and j is a relative position in the horizontal direction. sum_pixel (c, y, x) is data indicating a result of interpolation using the coefficient. Furthermore, sum_weight (c, y, x) indicates a total of the coefficients used for the interpolation.

The pixel interpolation unit 334 determines whether or not sum_weight (c, y, x) obtained in Expression 2 is less than a predetermined threshold value. In a case where sum_weight (c, y, x) is larger than the threshold value, the pixel interpolation unit 334 performs normalization by the following expression.

dst_pix(c, y, x)=sum_pix(c, y, x)/sum_weight(c, y, x)

On the other hand, in a case where sum_weight (c, y, x) is equal to or smaller than the threshold value, the pixel interpolation unit 334 makes the filter size of the Gaussian filter be a larger value than the previous value, and executes the above processing again to try interpolation. Here, an upper limit is set for the filter size in consideration of the influence on the image quality. After completion of the interpolation processing, the pixel interpolation unit 334 outputs the subframe after normalization.

As illustrated in FIGS. 15 to 19, the imaging device 100 performs the mapping processing on the basis of the motion data to correct camera shake, thereby improving the image quality. Furthermore, since the imaging device 100 has performed the Q-tree scanning, the exposure timing is temporally and spatially uniform, as described above. Therefore, even if the mapping processing is performed in camera shake correction, a defective pixel is less likely to occur. In contrast, in the raster scanning, since the exposure timing is not uniform, a defective pixel is more likely to occur.

Note that the imaging device 100 performs camera shake correction at the time of frame rate conversion, but the imaging device 100 may perform only the frame rate conversion without performing camera shake correction. In this case, the motion sensor 140 is unnecessary, and the frame rate conversion unit 300 performs the mapping process with the motion amount set to zero. Furthermore, since no defective pixels occur, interpolation of defective pixels is unnecessary.

Figure 20:
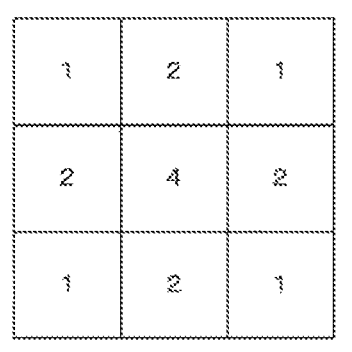

FIG. 20 is a diagram illustrating a configuration example of the coefficients in the Gaussian filter according to the first embodiment of the present technology. As illustrated in FIG. 20, "4" is set as the coefficient for a central pixel (in other words, the pixel of interest) in a 3 row×3 column Gaussian filter, for example. Furthermore, "2" is set as the coefficient for left and right, and top and bottom pixels of the center pixel, and "1" is set as the coefficient for the remaining pixels.

Figure 21:
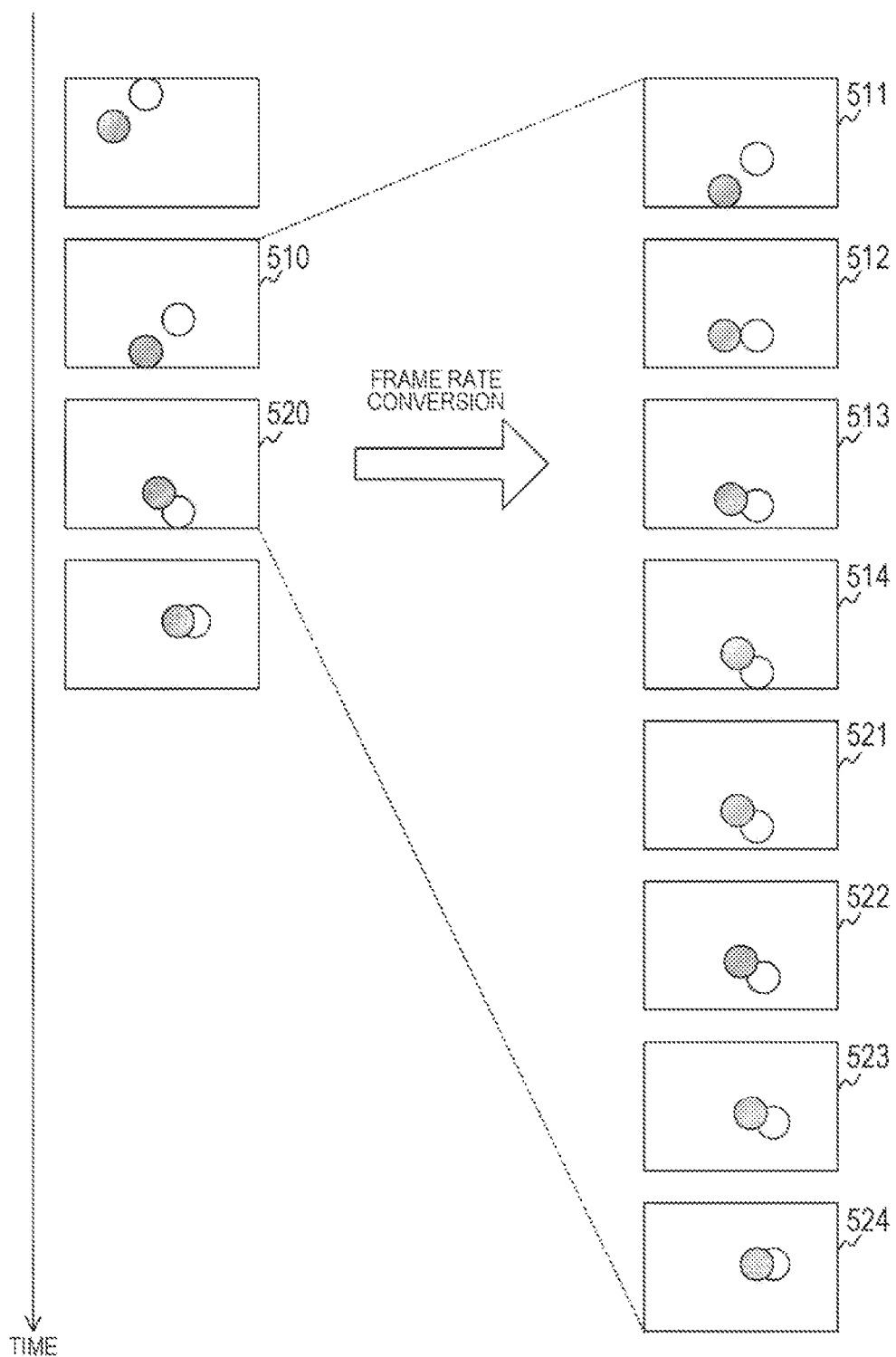
FIG. 21 is a diagram illustrating an example of moving image data before and after frame rate conversion according to the first embodiment of the present technology.

FIG. 21 is a diagram illustrating an example of the moving image data before and after the frame rate conversion according to the first embodiment of the present technology. It is assumed that moving image data including original frames 510 and 520 is imaged by the imaging element 200. The compression unit 131 compresses the moving image data and records the moving image data in the data storage 150.

Then, the decompression unit 135 divides, in decompression, each of the original frames in the moving image data into K subframes with the resolution of 1/K. For example, in a case where K is "4", the original frame 510 is divided into subframes 511, 512, 513, and 514 with the resolution of ¼. Furthermore, the original frame 520 is divided into subframes 521, 522, 523, and 524. By dividing the original frame into K subframes with the resolution of 1/K in this way, the frame rate can be improved without interpolating a new frame between frames.

[Operation Example of Imaging Device]

Figure 22:
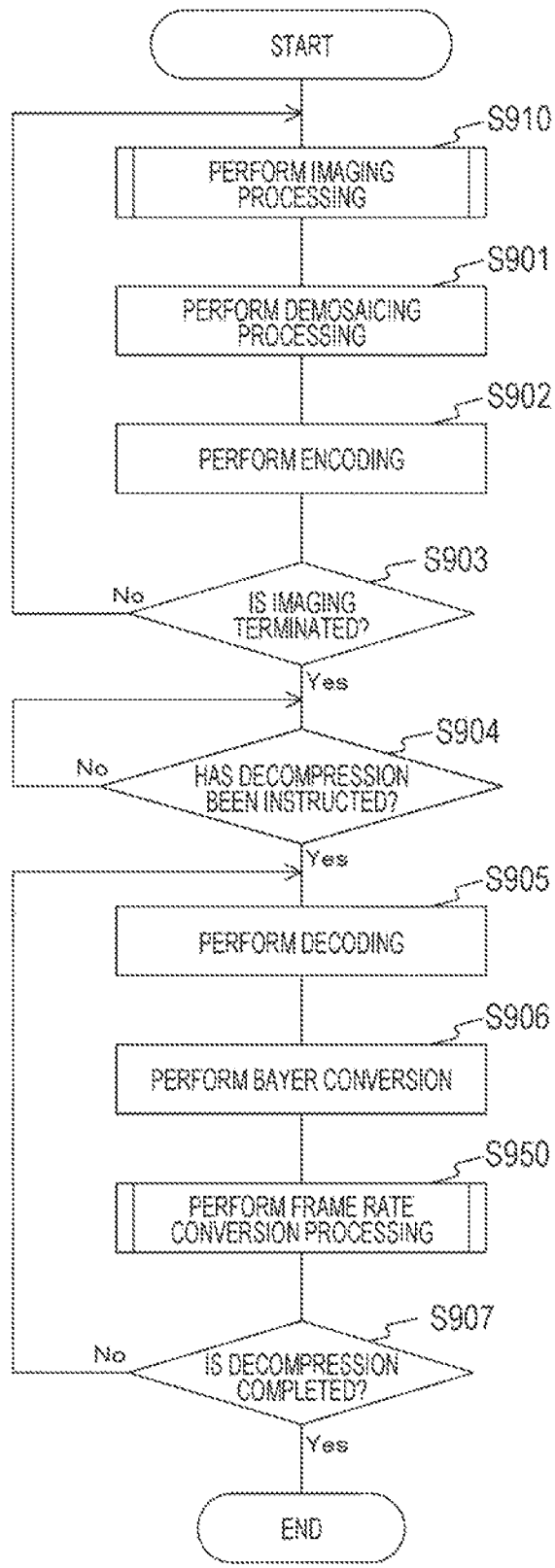
FIG. 22 is a flowchart illustrating an example of an operation of the imaging device according to the first embodiment of the present technology.

FIG. 22 is a flowchart illustrating an example of an operation of the imaging device 100 according to the first embodiment of the present technology. This operation is started when, for example, an operation (such as pressing down of a shutter button) for starting imaging is performed.

The imaging device 100 executes imaging processing for imaging the original frame (step S910). Then, the imaging device 100 performs the demosaicing processing (step S901) for the imaged original frame, and performs encoding for the moving image data (step S902).

The imaging device 100 determines whether or not terminating the imaging (step S903). For example, the imaging device 100 terminates the imaging when, for example, an operation (such as pressing down of a stop button) for terminating the imaging is performed. In a case where the imaging is not terminated (step S903: No), the imaging device 100 repeatedly executes the processing of step S910 and the subsequent steps.

On the other hand, in a case where the imaging is terminated (step S903: Yes), the imaging device 100 determines whether or not decompression of the moving image data has been instructed (step S904). Here, the instruction to decompress the moving image data may be for the entire moving image data or for a part of the moving image data. In a case where the decompression is not instructed (step S904: No), the imaging device 100 repeats step S904.

In a case where the decompression is instructed (step S904: Yes), the imaging device 100 decodes the compressed moving image data (step S905), and performs Bayer conversion for the original frame (step S906). Then, the imaging device 100 performs frame rate conversion processing for the moving image data (step S950).

The imaging device 100 determines whether or not the decompression has been completed (step S907). In a case where the decompression has not been completed (step S907: No), the imaging device 100 repeatedly executes the processing of step S905 and the subsequent steps. On the other hand, in a case where the decompression has been completed (step S907: Yes), the imaging device 100 terminates the operation.

Figure 23:
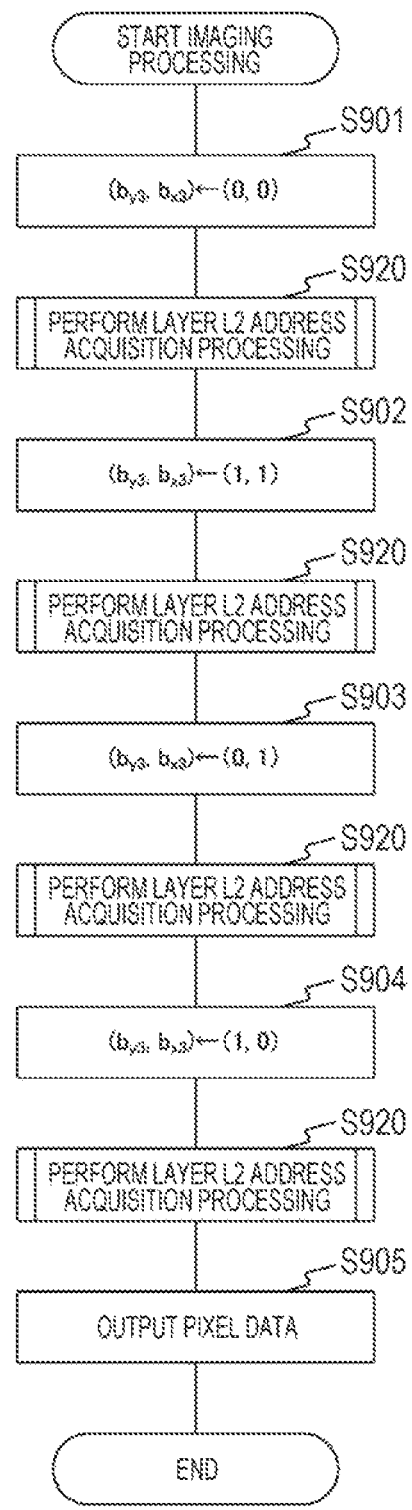
FIG. 23 is a flowchart illustrating an example of imaging processing according to the first embodiment of the present technology.

FIG. 23 is a flowchart illustrating an example of the imaging processing according to the first embodiment of the present technology. First, the imaging element 200 sets (0, 0) to the relative address $(b_{y3}, b_{x3})$ of the layer L3 (step S901), and executes layer L2 address acquisition processing (step S920) for acquiring the address of the layer L2.

Then, the imaging element 200 sets (1, 1) to $(b_{y3}, b_{x3})$ (step S902) and executes the layer L2 address acquisition processing (step S920). Next, the imaging element 200 sets (0, 1) to $(b_{y3}, b_{x3})$ (step S903) and executes the layer L2 address acquisition processing (step S920). Then, the imaging element 200 sets (1, 0) to $(b_{y3}, b_{x3})$ (step S904) and executes the layer L2 address acquisition processing (step S920). Within the layer L2 address acquisition processing, exposure of the pixels is started in a fixed exposure order.

The imaging element 200 terminates the exposure in the same order as the exposure start order and outputs the pixel data of all the pixels (step S905). After step S905, the imaging element 200 terminates the imaging processing.

Figure 24:
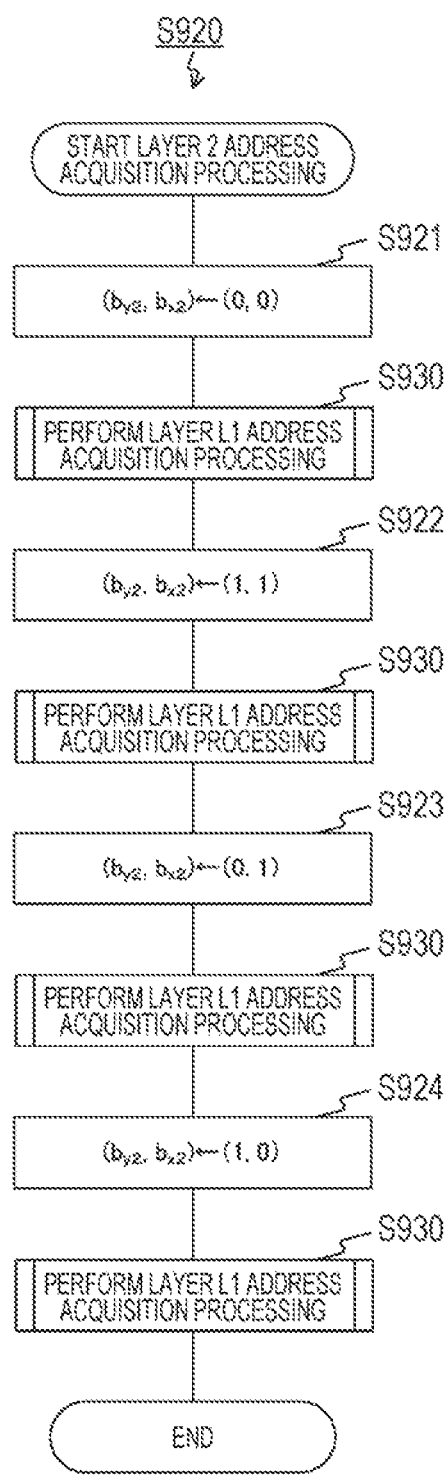
FIG. 24 is a flowchart illustrating an example of layer L2 address acquisition processing according to the first embodiment of the present technology.

FIG. 24 is a flowchart illustrating an example of the layer L2 address acquisition processing according to the first embodiment of the present technology. The imaging element 200 sets (0, 0) to the relative address $(b_{x2}, b_{y2})$ of the layer L2 (step S921) and executes layer L1 address acquisition processing (step S930) for acquiring the address of the layer L1.

Then, the imaging element 200 sets (1, 1) to $(b_{y2}, b_{x2})$ (step S922) and executes the layer L1 address acquisition processing (step S930). Next, the imaging element 200 sets (0, 1) to $(b_{y2}, b_{x1})$ (step S923) and executes the layer L1 address acquisition processing (step S930). Then, the imaging element 200 sets (1, 0) to $(b_{y2}, b_{x1})$ (step S924) and executes the layer L1 address acquisition processing (step S930) and terminates the layer L2 address acquisition processing.

Figure 25:
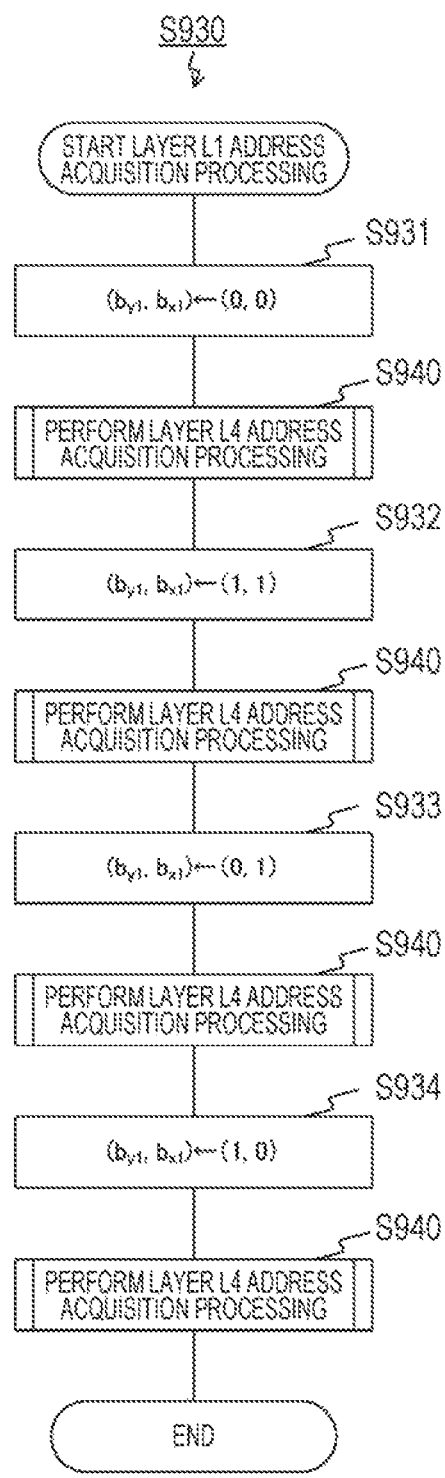
FIG. 25 is a flowchart illustrating an example of layer L1 address acquisition processing according to the first embodiment of the present technology.

FIG. 25 is a flowchart illustrating an example of the layer L1 address acquisition processing according to the first embodiment of the present technology. The imaging element 200 sets (0, 0) to the relative address $(b_{y1}, b_{x1})$ of the layer L1 (step S931), and executes layer L4 exposure processing (step S940) for acquiring and exposing the address of the layer L4.

Then, the imaging element 200 sets (1, 1) to $(b_{y1}, b_{x1})$ (step S932) and executes the layer L4 exposure processing (step S940). Next, the imaging element 200 sets (0, 1) to $(b_{y1}, b_{x1})$ (step S933) and executes the layer L4 exposure processing (step S940). Then, the imaging element 200 sets (1, 0) to $(b_{y1}, b_{x1})$ (step S934) and executes the layer L4 exposure processing (step S940) and terminates the layer L1 address acquisition processing.

Figure 26:
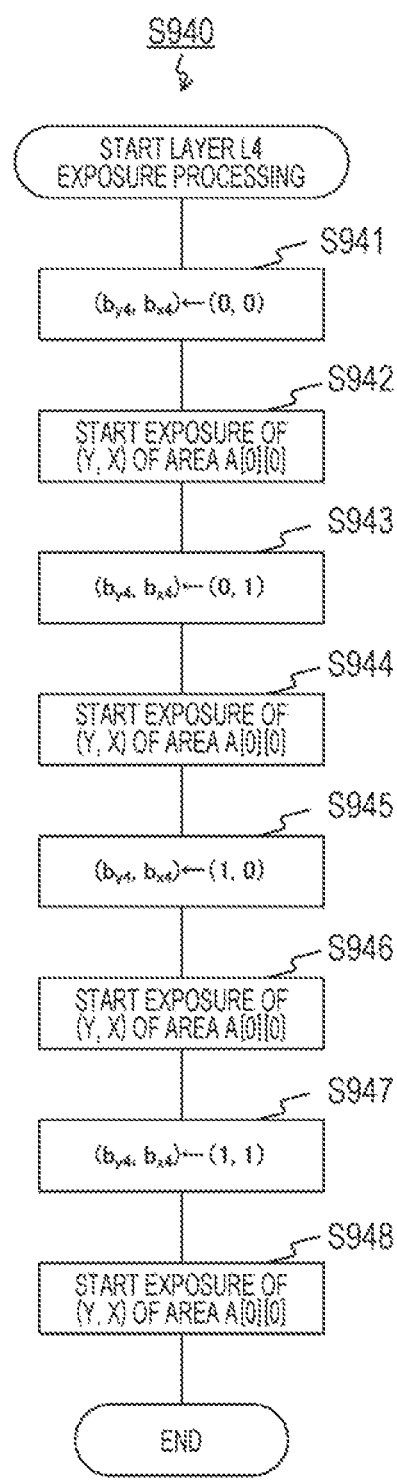
FIG. 26 is a flowchart illustrating an example of layer L4 exposure processing according to the first embodiment of the present technology.

FIG. 26 is a flowchart illustrating an example of the layer L4 exposure processing according to the first embodiment of the present technology. The imaging element 200 sets (0, 0) to the relative address $(b_{y4}, b_{x1})$ of the layer L4 (step S941), and starts exposure of the pixel of the relative address (Y, X) in the area A[0][0] (step S942). In the other areas, exposure is started for the pixels having the same address as the area A[0][0].

Then, the imaging element 200 sets (0, 1) to the relative address $(b_{y4}, b_{x1})$ of the layer L4 (step S943), and starts exposure of the pixel of the relative address (Y, X) in the area A[0][0] (step S944). Next, the imaging element 200 sets (1, 0) to the relative address $(b_{y4}, b_{x1})$ of the layer L4 (step S945), and starts exposure of the pixel of the relative address (Y, X) in the area A[0] [0] (step S946).

Then, the imaging element 200 sets (1, 1) to the relative address $(b_{y4}, b_{x1})$ of the layer L4 (step S947), and starts exposure of the pixel of the relative address (Y, X) in the area A[0][0] (step S948). In the other areas, exposure is started for the same address as the area A[0][0]. After step S948, the imaging element 200 terminates the layer L4 exposure processing.

Figure 27:
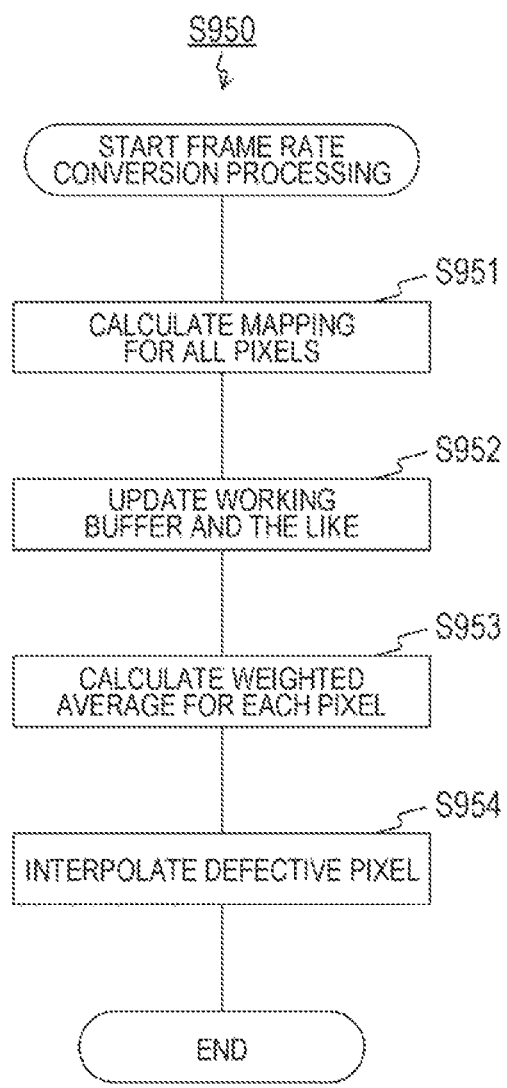
FIG. 27 is a flowchart illustrating an example of frame rate conversion processing according to the first embodiment of the present technology.

FIG. 27 is a flowchart illustrating an example of the frame rate conversion processing according to the first embodiment of the present technology. The image processing unit 130 performs mapping calculation for all the pixels on the basis of the motion data (step S951). Then, the image processing unit 130 performs mapping processing to update the working buffer and the weight table (step S952), and calculates the weighted average for each pixel (step S953). A subframe is generated by the mapping processing. Next, the image processing unit 130 interpolates a defective pixel in the subframe (step S954). After step S954, the image processing unit 130 terminates the frame rate conversion processing.

Figures 28A, 28B:
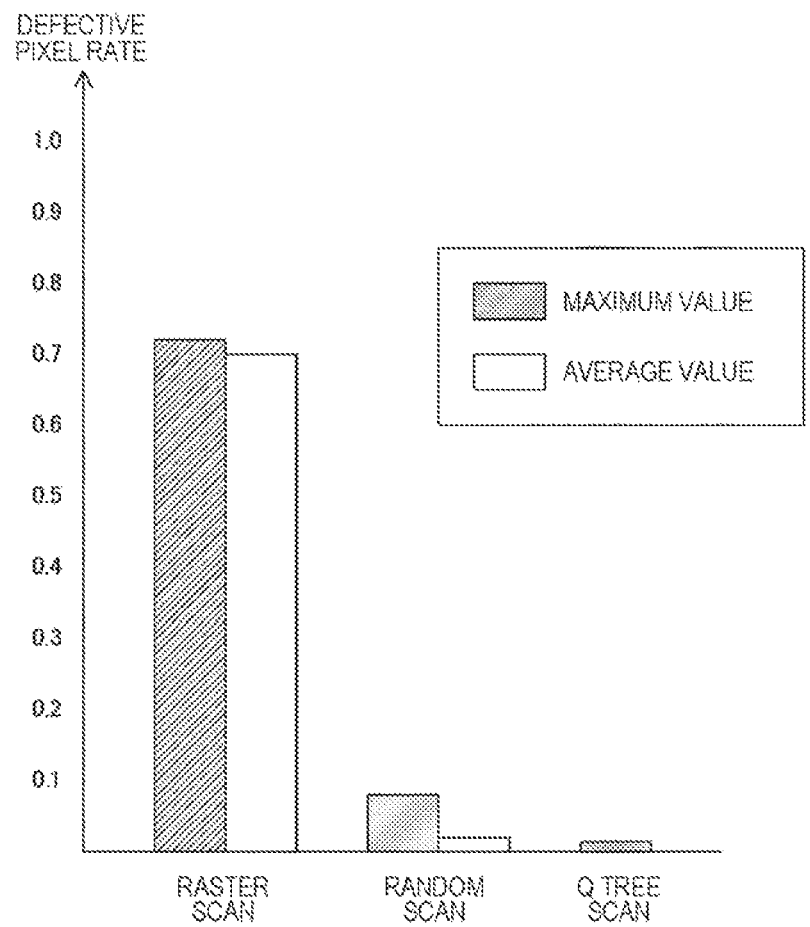
FIGS. 28A and 28B are diagrams illustrating an example of a defective pixel rate for each scanning method according to the first embodiment of the present technology.

FIGS. 28A and 28B are diagrams illustrating an example of a defective pixel rate for each scanning method according to the first embodiment of the present technology. Here, occurrence rates of defective pixels in a case where camera shake correction is performed for the frames obtained by the raster scanning, the random scanning, and the Q-tree scanning are obtained by simulation under the following conditions. Furthermore, in this simulation, a configuration having the ADC arranged for each column is assumed, instead of the configuration having the ADC arranged for each area.

The sensor size: 5.5×3.1 millimeters (mm)
The number of sensor pixels (full size): 5504×3104 pixels
The viewing angle: 70 degrees in the horizontal direction and 51 degrees in the vertical direction
The imaging frame rate (original frame rate): 30 fps
The number of imaging pixels (the number of pixels of the original frame): 4500×2800 pixels
The area size: 100×56 pixels
The number of areas: 45×50
The FD shared pixel unit: 2×4 pixels The number of vertical signal lines: 2 lines per 4 horizontal pixels The number of divisions K: 16

The output frame rate: 30×16=480 fps

The number of pixels of the subframe: (4500/4)×(2800/4) pixels=1125×700 pixels

The camera shake waveform: 1 to 9 hertz (Hz)

The area size and the number of areas indicate the size and the number of the areas 221 corresponding to the ADC 261. Furthermore, the number of pixels of the subframe is finally adjusted to 960 pixels×540 pixels by cutting out the periphery. Furthermore, the buffer size of the working buffer is one subframe.

FIG. 28A is a table illustrating a maximum value and an average value of the defective pixel rate for each scanning method obtained under the above conditions. FIG. 28B is a graph illustrating the maximum value and the average value of the defective pixel rate for each scanning method obtained under the above conditions. As illustrated in a and b, the defective pixel rate is the largest in the raster scanning. This is because temporally and spatially deviation occurs in the exposure timing as described above.

Meanwhile, in the random scanning, the deviation of the exposure timing is considerably improved as compared with the raster scanning. However, since partial deviation occurs, the defective pixel rate becomes higher than the Q-tree scanning. In the Q-tree scanning, the temporal and spatial uniformity of the exposure timing is ensured, so the defective pixel rate is the lowest. As a result, the image quality of the subframe can be improved.

Figure 29:
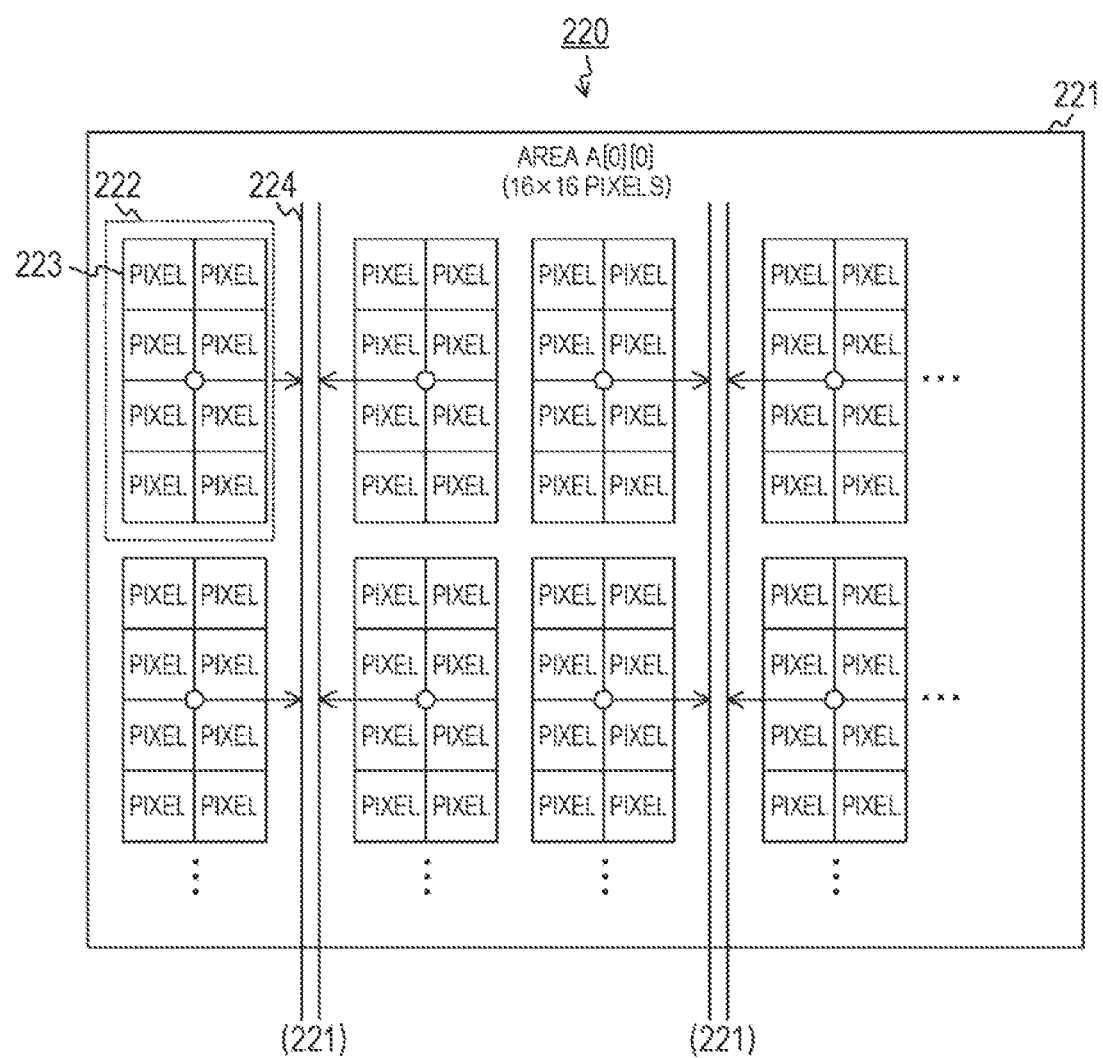
FIG. 29 is a plan view illustrating a configuration example of the pixel array unit in a case of column ADC according to the first embodiment of the present technology.

Note that in the imaging element 200, the ADC 261 can be arranged for each column of the pixels without arranging the ADC 261 for each area 221. In this case, for example, a plurality of pixel blocks 222 is arrayed in the area A[0][0], as illustrated in FIG. 29. The pixels 223 of 4 rows×2 columns are arrayed in each of the pixel blocks 222. These pixels 223 share a floating diffusion layer. A white circle in FIG. 29 represents the floating diffusion layer.

Furthermore, a plurality of vertical signal lines 224 is wired in the area A[0][0] along the vertical direction. The vertical signal line 224 is wired for each column of the pixel blocks 222. In a case where the number of the columns of the pixel blocks 222 in the area A[0][0] is R (R is an integer), R vertical signal lines 224 are wired. Then, an r-th (r is an integer from 0 to R−1) pixel block 222 is connected to an r-th vertical signal line 224. Each of the pixel blocks 222 outputs the pixel data via the connected vertical signal line 224.

In a case of arranging the ADC 216 for each column, the eight pixels 223 of 4 rows×2 columns share the floating diffusion layer, but the number of pixels sharing a floating diffusion layer is not limited to eight, and may be four pixels of 2 rows×2 columns, or the like. Alternatively, a configuration provided with the floating diffusion layer for each pixel 223 without sharing the floating diffusion layer may be adopted.

Figure 30:
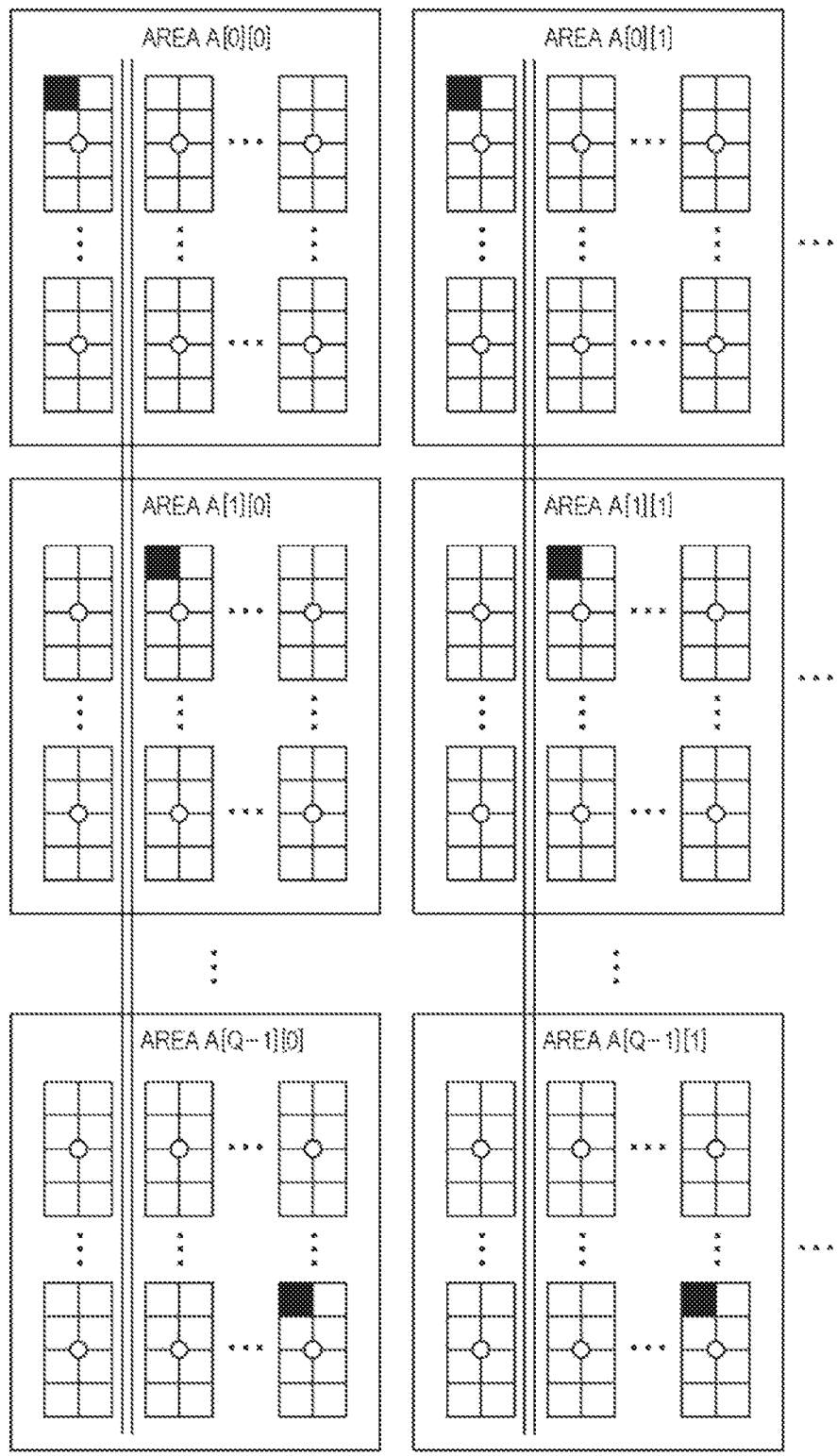
FIG. 30 is a diagram for describing an address shifting method according to the first embodiment of the present technology.

Furthermore, a method of shifting an address in a case of arranging the ADC 261 for each column will be described with reference to FIG. 30. As described above, the pixels in the area A[0][0] are exposed in a fixed order by the quadtree search. However, when the areas A[1][0] to A[Q−1][0] are exposed in a similar order, these areas share the vertical signal line and thus data collision occurs on the vertical signal line. To avoid the data collision, the scanning circuit 210 performs a shift operation for the relative X address obtained for the area A[0][0] and sets the shifted relative X address as the address of the areas A[1] [0] to A[Q−1][0].

For example, when acquiring an upper left address of the relative address (0 . . . 0, 0 . . . 0) for the area A[0][0], the scanning circuit 210 shifts "0 . . . 1" obtained by adding "1" to the relative X address to the left by one bit. The scanning circuit 210 sets "0 . . . 10" obtained by the shift operation as the relative X address of the area A[1][0]. Furthermore, the scanning circuit 210 sets "0 . . . 100" obtained by further shifting the address to the left by one bit as the relative Y address of the area A[2][0]. The relative X address is acquired by a similar procedure for the area A[3][0] and subsequent areas. The pixels of those addresses are simultaneously exposed. A black pixel in FIG. 30 represents a pixel to be exposed.

By shifting the address in this manner, the pixel data is read through the mutually different vertical signal lines in the areas A[0] [0] to A[Q−1][0].

The addresses are similarly shifted for the areas A[0][1] to A[Q−1][1]. This similarly applied to the areas A[0][2] and subsequent areas.

As described above, according to the first embodiment of the present technology, the imaging device 100 divides an area into a plurality of groups with exposed portions that are different from one another (layer L3) and generates the subframe for each group. Therefore, the frame rate can be improved without interpolating a frame.

[First Modification]

In the above-described first embodiment, the pixel array unit 220 has been segmented with the square areas 221. However, segmentation with squares may be difficult depending on an aspect ratio of the pixel array unit 220. In this case, the pixel array unit 220 may be segmented with rectangular areas 221. An imaging element 200 according to a first modification of the first embodiment is different from the first embodiment in segmenting a pixel array unit 220 with the rectangular areas 221.

Figure 31:
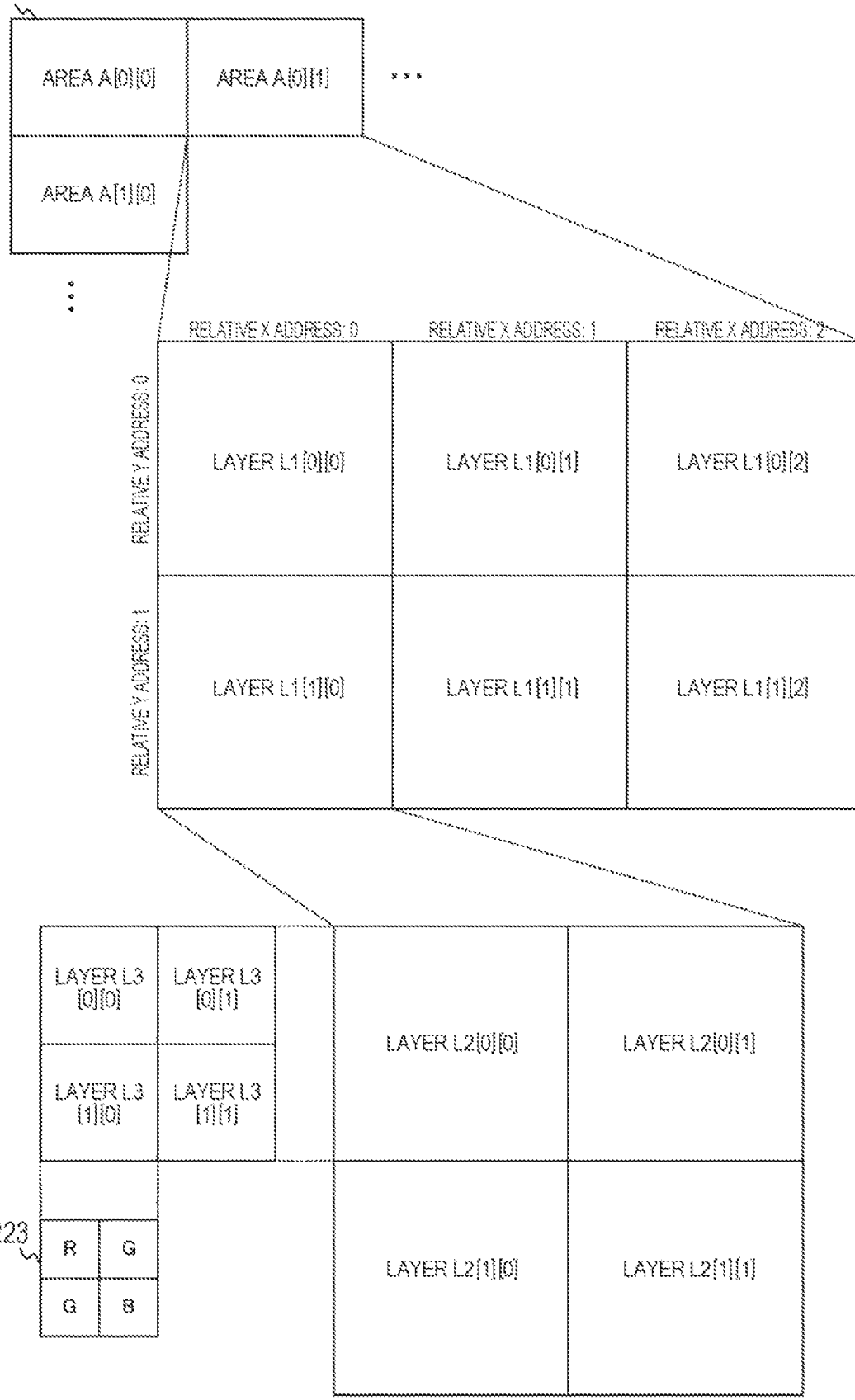
FIG. 31 is a diagram illustrating an example of a space dividing method according to a first modification of the first embodiment of the present technology.

FIG. 31 is a diagram illustrating an example of a space dividing method according to the first modification of the first embodiment of the present technology. The pixel array unit 220 is segmented with the rectangular areas 221, and each of the areas 221 is divided with a square layer L1 of 2 rows×3 columns. A relative Y address $b_{y1}$ of a layer L1 is "0" or "1", and a relative X address $b_{x1}$ is any of "0", "1", and "2" in decimal.

As described above, according to the first modification of the first embodiment of the present technology, since the pixel array unit 220 is segmented with the rectangular areas 221, the pixel array unit 220 in an aspect ratio for which segmentation with squares is difficult can be segmented.

[Second Modification]

In the above-described first embodiment, the imaging element 200 has performed the frame rate conversion without changing a dynamic range. However, there is a possibility that the dynamic range becomes insufficient in imaging under natural light, for example, and the image quality deteriorates due to blown out highlights or blocked up shadows. An imaging element 200 according to a second modification of the first embodiment is different from the first embodiment in enlarging a dynamic range at frame rate conversion.

Figure 32:
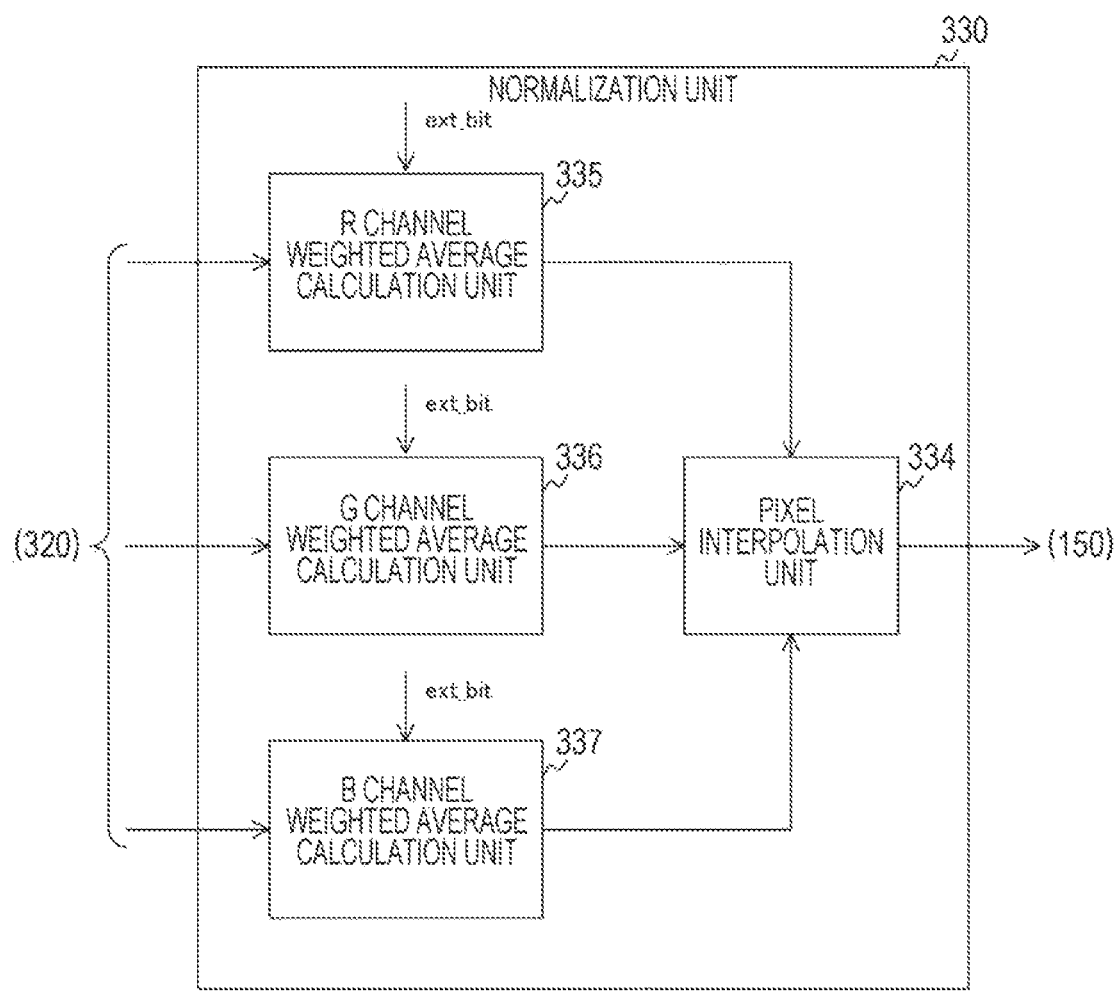
FIG. 32 is a block diagram illustrating a configuration example of a normalization unit according to a second modification of the first embodiment of the present technology.

FIG. 32 is a block diagram illustrating a configuration example of a normalization unit 330 according to the second modification of the first embodiment of the present technology. The normalization unit 330 in the second modification is different from the first embodiment in including an R channel weighted average calculation unit 335 in place of the R channel weighted average calculation unit 331. Furthermore, the normalization unit 330 according to the second modification includes a G channel weighted average calculation unit 336 and a B channel weighted average calculation unit 337 in place of the G channel weighted average calculation unit 332 and the B channel weighted average calculation unit 333.

The R channel weighted average calculation unit 335 is different from the first embodiment in calculating a weighted average by the following expression. This similarly applied to the G channel weighted average calculation unit 336 and the B channel weighted average calculation unit 337.

work_buff(c,y,x)=(work_buff(c,y,x)<<ext_bit)/weight_table(c,y,x)

In the above expression, ext_bit indicates a shift amount, and "<<" indicates a left shift operation.

Furthermore, the dynamic range can be made wider as a value of "ext_bit" is set to be larger in the above expression.

As described above, according to the second modification of the first embodiment of the present technology, the imaging element 200 shifts a value of a working buffer to the left, thereby making the dynamic range wide by the shift amount.

[Third Modification]

In the above-described first embodiment, the imaging element 200 has divided the original frame into the subframes with the resolution of 1/K to make the output frame rate be K times the original frame rate. However, the resolution is lowered as the output frame rate is made higher. Furthermore, the output frame rate is lowered as the resolution of the subframe is made higher. An imaging element 200 according to a third modification of the first embodiment is different from the first embodiment in suppressing a decrease in resolution and a frame rate.

Figure 33:
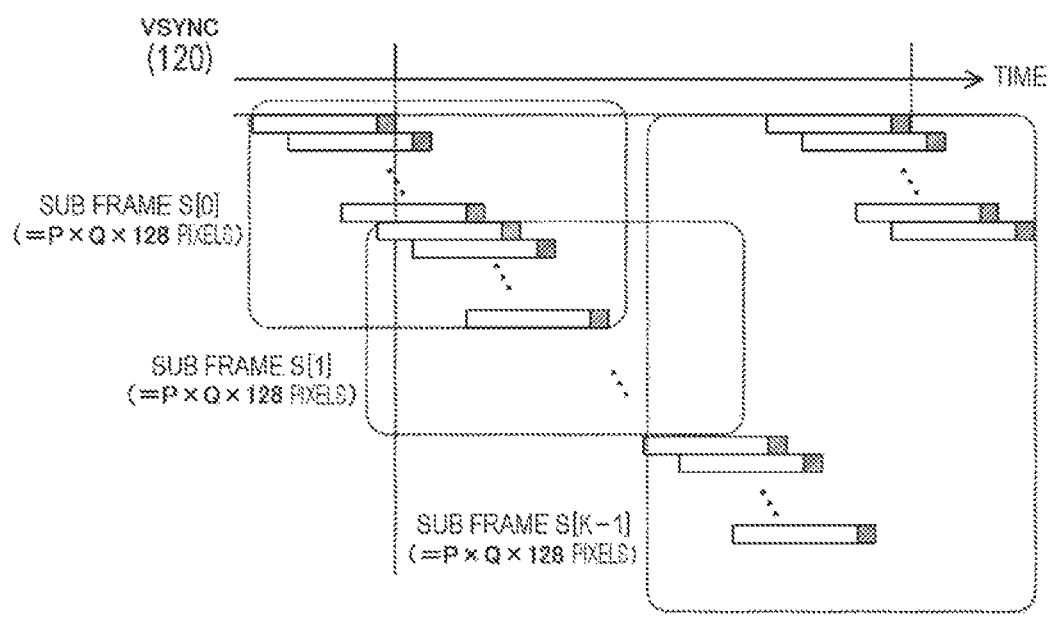
FIG. 33 is a diagram illustrating an example of a frame dividing method according to a third modification of the first embodiment of the present technology.

FIG. 33 is a diagram illustrating an example of a frame dividing method according to the third modification of the first embodiment of the present technology. An image processing unit 130 according to the third modification divides a pixel group in the area 221 into K groups in which exposure orders are consecutive and two adjacent groups partially overlap each other. For example, assume that the number of pixels in the area 221 is 256 and K is "4". In this case, the pixel group is divided into four groups of a group including 0th to 127th pixels, a group including 64th to 191st pixels, a group including 128th to 255th pixels, and a group including 192nd to 255th pixels and the next 0th to 63rd pixels. Then, the image processing unit 130 generates a subframe for each group. A portion enclosed by a dotted line in FIG. 33 indicates the group corresponding to the subframe. By dividing the area in this manner, the number of pixels of each subframe is improved to P×Q×128 pixels.

Since two adjacent subframes partially overlap, the image processing unit 130 is provided with a working buffer for two subframes. This also similarly applies to a weight-table. Hereinafter, a buffer size of the working buffer for B subframes (B is an integer) is "B".

Note that the pixel group is divided into K groups in which two adjacent groups partially overlap with each other. However, the pixel group may be divided into groups in which three or more adjacent groups partially overlap with one another. In this case, the buffer size B is set to "3" or more.

By setting the buffer size B to "2" or more, the resolution of the subframe can be improved under a fixed output frame rate. Furthermore, the output frame rate can be improved under a fixed resolution of the subframe.

For example, in the first embodiment, the following expression holds.

[Math. 3]

$$\frac{OriginalResolution \times OriginalFrameRate}{OutputResolution \times OutputFrameRate} \cdot \quad \text{Expression 3}$$
$$(1 - DefectPixelRatio) \leq 1$$

In the above expression, "OriginalResolution" indicates the resolution of the original frame, and "OriginalFrameRate" indicates the frame rate before the frame rate conversion. Furthermore, "OutputResolution" indicates the resolution of the subframe, and "OutputFrameRate" indicates the frame rate after the frame rate conversion. "DefectPixelRatio" indicates the occurrence rate of the defective pixel in the subframe. From the above expression, in a case where DefectPixelRatio is sufficiently close to 0, the resolution is set to 1/K, whereby the frame rate can be made K times.

In contrast, in the third modification of the first embodiment, the frame rate and the resolution can be set within a range where the following expression holds.

[Math. 4]

$$1 \leq \frac{Original\ Resolution \times OriginalFrameRate}{Output\ Resolution \times OutputFrameRate} \cdot \quad \text{Expression 4}$$
$$(1 - DefectPixelRatio) \cdot BufferSize$$

In the above expression, "BufferSize" indicates the size B of the working buffer. According to the above expression, in a case of setting the resolution of the subframe to 1/K, the frame rate can be made higher than K times. Furthermore, in setting the frame rate to K times, the resolution of the subframe can be made higher than 1/K.

Note that, in a case of applying the second modification to the first embodiment, the following expression holds instead of Expression 3.

[Math. 5]

$$\frac{Original\ Resolution \times}{Output\ Resolution \times} \quad \text{Expression 5}$$
$$\frac{OriginalFrameRate \times OriginalDynamicRange}{OutputFrameRate \times OutputDynamicRange} \cdot$$
$$(1 - DefectPixelRatio) \leq 1$$

In the above expression, "OriginalDynamicRange" indicates the dynamic range of the original frame, and "OutputDynamicRange" indicates the dynamic range of the subframe.

Furthermore, in a case of applying the second modification the third modification, the following expression holds instead of Expression 4.

[Math. 6]

$$1 \leq \frac{OriginalResolution \times OriginalFrameRate \times OriginalDynamicRange}{OutputResolution \times OutputFrameRate \times OutputDynamicRange} \quad (1 - DefectPixelRatio) \cdot BufferSize$$

Expression 6

As described above, in the third modification of the first embodiment of the present technology, the image processing unit 130 generates the K subframes that partially overlap with each other. Therefore, the resolution and the output frame rate of the subframe can be improved.

2. Second Embodiment

In the above-described first embodiment, the imaging device 100 includes the motion sensor 140, and has performed the camera shake correction using the motion data detected by the sensor. However, camera shake correction can be performed in a configuration not including a motion sensor 140. An imaging device 100 according to a second embodiment is different from the first embodiment in performing camera shake correction without using the motion sensor 140.

Figure 34:
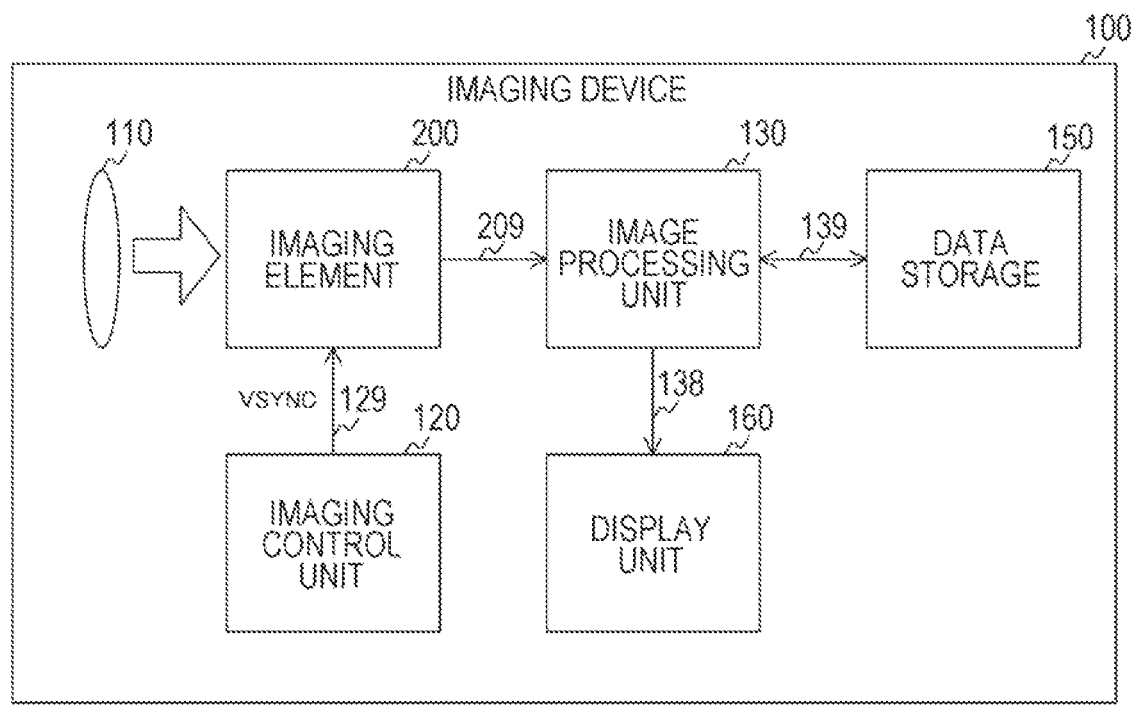
FIG. 34 is a block diagram illustrating a configuration example of an imaging device according to a second embodiment of the present technology.

FIG. 34 is a block diagram illustrating a configuration example of the imaging device 100 according to the second embodiment of the present technology. The imaging device 100 according to the second embodiment is different from the first embodiment in not including the motion sensor 140.

Figure 35:
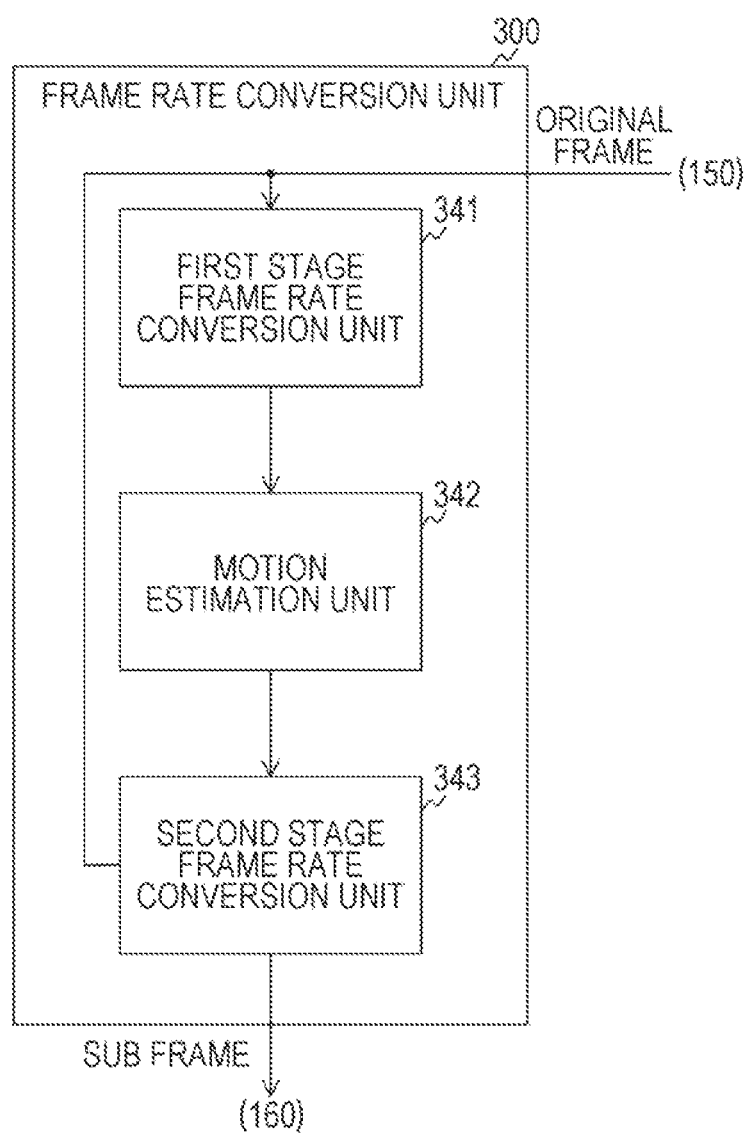
FIG. 35 is a block diagram illustrating a configuration example of a frame rate conversion unit according to the second embodiment of the present technology.

FIG. 35 is a block diagram illustrating a configuration example of a frame rate conversion unit 300 according to the second embodiment of the present technology. The frame rate conversion unit 300 according to the second embodiment includes a first stage frame rate conversion unit 341, a motion estimation unit 342, and a second stage frame rate conversion unit 343.

The first stage frame rate conversion unit 341 sets a motion amount to "0" and divides each original frame into K subframes. The first stage frame rate conversion unit 341 supplies moving image data including the subframes to the motion estimation unit 342.

The motion estimation unit 342 estimates a motion of the imaging device 100 from the moving image data. For example, the motion estimation unit 342 superimposes a common portion in two consecutive subframes and performs positioning, and estimates a shifted amount and a shifted direction as a motion amount and a motion direction for the entire subframes. Then, the motion estimation unit 342 supplies a motion vector indicating the motion amount and the motion direction to the second stage frame rate conversion unit 343. The second stage frame rate conversion unit 343 cuts out a part of the subframe, and shifts and outputs the whole cut part along the motion vector.

The second stage frame rate conversion unit 343 performs similar frame rate conversion to the first embodiment, using the estimated motion vector.

As described above, in the second embodiment of the present technology, the imaging device 100 estimates the motion from the subframes and performs mapping along the motion, thereby performing camera shake correction without a motion sensor. Therefore, cost and power consumption can be reduced by the amount of the motion sensor.

<3. Application Example to Mobile Bodies>

The technology according to the present disclosure (present technology) can be applied to various products. For example, the technology according to the present disclosure may be realized as a device mounted on any type of moving bodies including an automobile, an electric automobile, a hybrid electric automobile, an electric motorcycle, a bicycle, a personal mobility, an airplane, a drone, a ship, a robot and the like.

Figure 36:
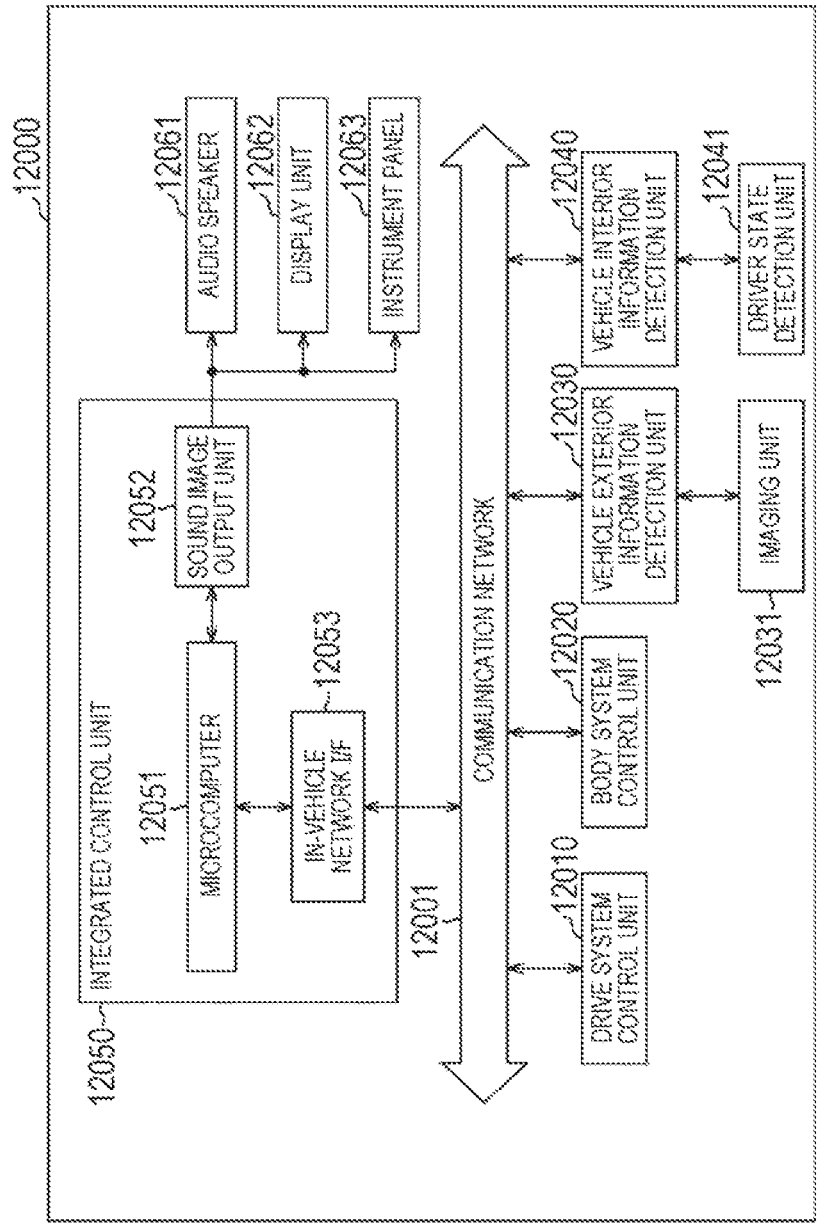
FIG. 36 is a block diagram illustrating an example of a schematic configuration of a vehicle control system.

FIG. 36 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 36, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle and the like.

The body system control unit 12020 controls operations of devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters or the like on a road surface on the basis of the received image.

The imaging unit 12031 is an optical sensor that receives light and outputs an electrical signal according to the amount of received light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle and the like.

Furthermore, the microcomputer 12051 controls the drive force generation device, the steering mechanism, the braking device or the like on the basis of the information of a vicinity of the vehicle acquired in the vehicle exterior information detection unit 12030 or the vehicle interior information detection unit 12040 to perform cooperative control for the purpose of automatic driving of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify information to a passenger of the vehicle or an outside of the vehicle. In the example in FIG. 36, as the output device, an audio speaker 12061, a display unit 12062, and an instrument panel 12063 are exemplarily illustrated. The display unit 12062 may include, for example, at least one of an on-board display or a head-up display.

Figure 37:
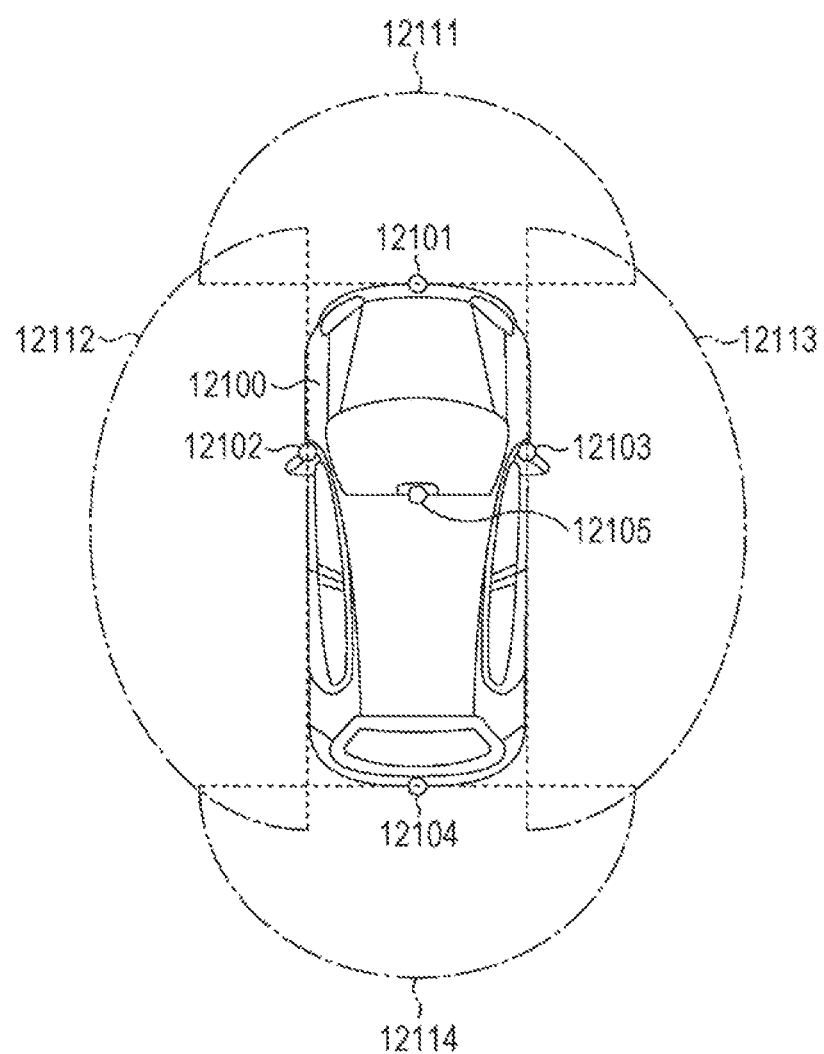
FIG. 37 is an explanatory diagram illustrating an example of installation positions of a vehicle exterior information detection unit and an imaging unit.

FIG. 37 is a diagram illustrating an example of an installation position of the imaging unit 12031.

In FIG. 37, as the imaging unit 12031, imaging units 12101, 12102, 12103, 12104, and 12105 are included.

The imaging units 12101, 12102, 12103, 12104, and 12105 are provided at positions such as a front nose, side mirrors, a rear bumper or a back door, and an upper portion of a windshield in an interior of the vehicle 12100, for example. The imaging unit 12101 provided at the front nose and the imaging unit 12105 provided at an upper portion of the windshield in an interior of the vehicle mainly acquire front images of the vehicle 12100. The imaging units 12102 and 12103 provided at the side mirrors mainly acquire side images of the vehicle 12100. The imaging unit 12104 provided at the rear bumper or the back door mainly acquires a rear image of the vehicle 12100. The imaging unit 12105 provided at the upper portion of the windshield in the interior of the vehicle is mainly used for detecting a preceding vehicle, a pedestrian, an obstacle, a traffic signal, a traffic sign, a lane, or the like.

Note that FIG. 37 illustrates an example of imaging ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of imaging elements or may be an imaging element having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic driving of autonomous travel without depending on an operation of the driver or the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. Then, the microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. The recognition of a pedestrian is performed by a process of extracting characteristic points in the captured images of the imaging units 12101 to 12104, as the infrared camera, for example, and by a process of performing pattern matching processing for a series of characteristic points indicating a contour of an object and discriminating whether or not the object is a pedestrian. When the microcomputer 12051 determines that a pedestrian exists in the captured images of the imaging units 12101 to 12104 and recognizes the pedestrian, the sound image output unit 12052 controls the display unit 12062 to superimpose and display a square contour line for emphasis on the recognized pedestrian. Furthermore, the sound image output unit 12052 may control the display unit 12062 to display an icon or the like representing the pedestrian at a desired position.

An example of a vehicle control system to which the technology according to the present disclosure is applicable has been described. The technology according to the present disclosure is applicable to the imaging units 12101 to 12104, of the above-described configurations. Specifically, the image processing unit in the imaging unit divides the original frame into the K subframes, thereby making the frame rate K times. By applying the technology according to the present disclosure to the imaging units 12101 to 12104, the frame rate is converted and a moving body at a high speed can be easily detected.

Note that the above-described embodiments describe an example for embodying the present technology, and the matters in the embodiments and the matters used to specify the invention in the claims have correspondence, respectively. Similarly, the matters used to specify the invention in the claims and the matters in the embodiment of the present technology given the same names have correspondence, respectively. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a mini disc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) An imaging device including:
a pixel array unit divided into a plurality of divided regions, each divided region including a plurality of partial regions;
a scanning circuit configured to sequentially perform control of exposing a predetermined number of regions of the plurality of partial regions as first partial regions to output first pixel data in each of the plurality of divided regions, and control of exposing a region different from the first partial regions of the plurality of partial regions as a second partial region to output second pixel data in each of the plurality of divided regions; and
an image processing unit configured to sequentially perform processing of generating a first frame from the first pixel data and processing of generating a second frame from the second pixel data.

(2) The imaging device according to (1), in which the plurality of divided regions is regions obtained by dividing the pixel array unit by quadtree division, the plurality of partial regions is regions obtained by dividing each of the plurality of divided regions by quadtree division, and
the scanning circuit obtains each of the first and second partial regions by quadtree search and exposes the first and second partial regions.

(3) The imaging device according to (1) or (2), further including:
a plurality of analog-digital converters connected to segmented regions different from one another, in which
each of the segmented regions includes a predetermined number of the divided regions, and
each of the plurality of analog-digital converters performs analog-digital conversion for pixel data from the connected segmented region and supplies the converted pixel data to the image processing unit.

(4) The imaging device according to (3), further including:
a signal line wired in a predetermined direction in the pixel array unit, in which
the pixel data is transmitted via the signal line, and
the scanning circuit exposes the partial regions different from one another in each of the segmented regions arrayed along a predetermined direction as the first partial regions.

(5) The imaging device according to any one of (1) to (4), in which
the scanning circuit performs the control in synchronization with a predetermined synchronization signal, and
a blank interval from timing when last pixel data in the segmented region is output to timing of rising of the predetermined synchronization signal is substantially zero.

(6) The imaging device according to any one of (1) to (5), further including:
a motion sensor configured to detect a motion of the imaging device, in which
the image processing unit maps the first pixel data on the basis of the motion from one to the other of an exposure center time of the first frame and an exposure center time of the first pixel data to generate the first frame, and maps the second pixel data on the basis of the motion from one to the other of an exposure center time of the second frame and an exposure center time of the second pixel data to generate the second frame.

(7) The imaging device according to (6), in which
the image processing unit interpolates a defective pixel in each of the generated first and second frames.

(8) The imaging device according to any one of (1) to (5), in which the image processing unit includes a first stage processing unit that generates moving image data including the first frame and the second frame, a motion estimation unit that estimates a motion of the imaging device from the moving image data, and a second stage processing unit that maps the first pixel data on the basis of the motion from one to the other of an exposure center time of the first frame and an exposure center time of the first pixel data to generate the first frame, and maps the second pixel data on the basis of the motion from one to the other of an exposure center time of the second frame and an exposure center time of the second pixel data to generate the second frame.

(9) The imaging device according to any one of (1) to (8), in which the image processing unit enlarges dynamic ranges of the first and second frames.

(10) The imaging device according to any one of (1) to (9), in which the image processing unit generates the first and second frames partially overlapping with each other.

(11) An imaging element including:
a pixel array unit divided into a plurality of divided regions, each divided region including a plurality of partial regions; and
a scanning circuit configured to sequentially perform control of exposing a predetermined number of regions of the plurality of partial regions as first partial regions to output first pixel data in each of the plurality of divided regions, and control of exposing a region different from the first partial regions of the plurality of partial regions as a second partial region to output second pixel data in each of the plurality of divided regions.

(12) A method of controlling an imaging device, the method including:
a scanning process of sequentially performing, in a pixel array unit divided into a plurality of divided regions, each divided region including a plurality of partial regions, control of exposing a predetermined number of regions of the plurality of partial regions as first partial regions to output first pixel data in each of the plurality of divided regions, and control of exposing a region different from the first partial regions of the plurality of partial regions as a second partial region to output second pixel data in each of the plurality of divided regions; and an image processing process of sequentially performing processing of generating a first frame from the first pixel data and processing of generating a second frame from the second pixel data.

REFERENCE SIGNS LIST

100 Imaging device
110 Imaging lens
120 Imaging control unit
130 Image processing unit
131 Compression unit
132 Demosaicing processing unit
133 Encoding unit
135 Decompression unit
136 Decoding unit
137 Bayer conversion unit
140 Motion sensor
150 Data storage
160 Display unit
200 Imaging element
201 Upper substrate
202 Lower substrate
210 Scanning circuit
220 Pixel array unit
221 Area
222 Pixel block
223 Pixel
260 AD conversion unit
261 ADC
300 Frame rate conversion unit
310 Mapping calculation unit
320 Mapping processing unit
321 Selector
322 R channel buffer updating unit
323 G channel buffer updating unit
324 B channel buffer updating unit
325 R channel buffer
326 G channel buffer
327 B channel buffer
330 Normalization unit
331, 335 R channel weighted average calculation unit
332, 336 G channel weighted average calculation unit
333, 337 B channel weighted average calculation unit
334 Pixel interpolation unit
340 Control unit
341 First stage frame rate conversion unit
342 Motion estimation unit
343 Second stage frame rate conversion unit
12101, 12102, 12103, 12104, 12105 Imaging unit

The invention claimed is:

1. An imaging device, comprising:
a pixel array unit divided into a plurality of divided regions, wherein
the plurality of divided regions is regions obtained based on division of the pixel array unit by a quadtree division,
each divided region includes a plurality of partial regions, and
the plurality of partial regions is regions obtained based on division of each of the plurality of divided regions by the quadtree division;
a scanning circuit configured to:
obtain first partial regions of the plurality of partial regions and a second partial region of the plurality of partial regions based on a quadtree search, wherein the second partial region is different from the first partial regions of the plurality of partial regions;
sequentially control exposure of a determined number of the first partial regions of the plurality of partial regions to output first pixel data in each divided region of the plurality of divided regions; and
control exposure of the second partial region of the plurality of partial regions to output second pixel data in each divided region of the plurality of divided regions;
and
an image processing unit configured to:
sequentially generate a first frame from the first pixel data; and
generate a second frame from the second pixel data.

2. The imaging device according to claim 1, further comprising
a plurality of analog-digital converters connected to a plurality of segmented regions different from one another, wherein
each segmented region of the plurality of segmented regions includes a determined number of the plurality of divided regions, and
each analog-digital converter of the plurality of analog-digital converters is configured to:
perform analog-digital conversion for pixel data from a corresponding connected segmented region of the plurality of segmented regions; and
supply the converted pixel data to the image processing unit.

3. The imaging device according to claim 2, further comprising
a signal line wired in a determined direction in the pixel array unit, wherein
the pixel data is transmitted via the signal line, and
the scanning circuit is further configured to expose the plurality of partial regions different from one another in each of the plurality of segmented regions arrayed along the determined direction as the first partial regions.

4. The imaging device according to claim 2, wherein the scanning circuit is further configured to control exposure in synchronization with a determined synchronization signal, and
a blank interval from a first timing when last pixel data in a segmented region of the plurality of segmented regions is output to a second timing of rising of the determined synchronization signal is substantially zero.

5. The imaging device according to claim 1, further comprising:
a motion sensor configured to detect a motion of the imaging device, wherein
the image processing unit is further configured to:
map the first pixel data based on the motion from an exposure center time of the first frame to an exposure center time of the first pixel data to generate the first frame; and
map the second pixel data based on the motion from an exposure center time of the second frame to an exposure center time of the second pixel data to generate the second frame.

6. The imaging device according to claim 5, wherein the image processing unit is further configured to interpolate a defective pixel in each of the generated first frame and the second frame.

7. The imaging device according to claim 1, wherein the image processing unit includes:
a first stage processing unit configured to generate moving image data including the first frame and the second frame;
a motion estimation unit configured to estimate a motion of the imaging device based on the moving image data; and
a second stage processing unit configured to:
map the first pixel data based on the motion from an exposure center time of the first frame to an exposure center time of the first pixel data to generate the first frame; and
map the second pixel data based on the motion from an exposure center time of the second frame to an exposure center time of the second pixel data to generate the second frame.

8. The imaging device according to claim 1, wherein the image processing unit is further configured to enlarge dynamic ranges of the first frame and the second frame.

9. The imaging device according to claim 1, wherein the image processing unit is further configured to generate the first frame and the second frame partially overlapping with each other.

10. An imaging element, comprising:
a pixel array unit divided into a plurality of divided regions, wherein
the plurality of divided regions is regions obtained based on division of the pixel array unit by a quadtree division,
each divided region includes a plurality of partial regions, and
the plurality of partial regions is regions obtained based on division of each of the plurality of divided regions by the quadtree division; and
a scanning circuit configured to:
obtain first partial regions of the plurality of partial regions and a second partial region of the plurality of partial regions based on a quadtree search, wherein the second partial region is different from the first partial regions of the plurality of partial regions;
sequentially control exposure of a determined number of the first partial regions of the plurality of partial regions to output first pixel data in each of the plurality of divided regions; and
control exposure of the second partial region of the plurality of partial regions to output second pixel data in each of the plurality of divided regions.

11. A method of controlling an imaging device, the method comprising:
obtaining first partial regions of a plurality of partial regions and a second partial region of the plurality of partial regions based on a quadtree search, wherein
the second partial region is different from the first partial regions of the plurality of partial regions,
the plurality of partial regions is included in each divided region of a plurality of divided regions of a pixel array unit,
the plurality of divided regions is regions obtained based on division of the pixel array unit by a quadtree division, and
the plurality of partial regions is regions obtained based on division of each of the plurality of divided regions by the quadtree division;
sequentially controlling exposure of a determined number of the first partial regions of the plurality of partial regions to output first pixel data in each divided region of the plurality of divided regions;
controlling exposure of the second partial region of the plurality of partial regions to output second pixel data in each divided region of the plurality of divided regions;
sequentially generating a first frame from the first pixel data; and
generating a second frame from the second pixel data.

12. An imaging device, comprising:
a pixel array unit divided into a plurality of divided regions, each divided region including a plurality of partial regions;
a scanning circuit configured to:
sequentially control exposure of a determined number of first partial regions of the plurality of partial regions to output first pixel data in each divided region of the plurality of divided regions; and
control exposure of a second partial region to output second pixel data in each divided region of the plurality of divided regions; and
an image processing unit configured to:
sequentially generate a first frame from the first pixel data; and
generate a second frame from the second pixel data, wherein the image processing unit includes:
a first stage processing unit configured to generate moving image data including the first frame and the second frame;
a motion estimation unit configured to estimate a motion of the imaging device based on the moving image data; and
a second stage processing unit configured to:
map the first pixel data based on the motion from an exposure center time of the first frame to an exposure center time of the first pixel data to generate the first frame; and
map the second pixel data based on the motion from an exposure center time of the second frame to an exposure center time of the second pixel data to generate the second frame.

* * * * *